United States Patent
Takemori et al.

(10) Patent No.: US 6,787,616 B2
(45) Date of Patent: Sep. 7, 2004

(54) CATALYST FOR OLEFIN POLYMERIZATION AND PROCESS FOR POLYMERIZING OLEFIN BY MEANS THEREOF

(75) Inventors: Toshifumi Takemori, Chiba (JP); Masashi Iida, Chiba (JP); Minoru Iijima, Chiba (JP); Yoshihisa Hayashida, Chiba (JP); Masao Kawahara, Chiba (JP)

(73) Assignee: Maruzen Petrochemical Co., Ltd., Tokyo (JP)

(*) Notice: Subject to any disclaimer, the term of this patent is extended or adjusted under 35 U.S.C. 154(b) by 0 days.

(21) Appl. No.: 10/463,698

(22) Filed: Jun. 18, 2003

(65) Prior Publication Data

US 2004/0010104 A1 Jan. 15, 2004

(30) Foreign Application Priority Data

Jul. 12, 2002 (JP) ........................................ 2002-204480
Aug. 28, 2002 (JP) ........................................ 2002-248836

(51) Int. Cl.⁷ .............................. C08F 4/608; C08F 4/64
(52) U.S. Cl. ...................... 526/129; 526/160; 526/165; 526/943; 502/120; 502/132; 502/152; 502/154
(58) Field of Search ................................. 502/120, 132, 502/152, 154; 526/160, 165, 129, 343

(56) References Cited

U.S. PATENT DOCUMENTS 5,789,502 A   8/1998   Shamshoum et al.
5,824,620 A * 10/1998   Vega et al. ................. 502/117

FOREIGN PATENT DOCUMENTS

| EP | 0 856 525 | 8/1998 |
|---|---|---|
| EP | 1 231 225 | 8/2002 |
| JP | 58-19309 | 2/1983 |
| JP | 60-35006 | 2/1985 |
| JP | 61-108610 | 5/1986 |
| JP | 61-296008 | 12/1986 |
| JP | 63-280703 | 11/1988 |
| JP | 6-329714 | 11/1994 |
| JP | 2000-86672 | 3/2000 |
| WO | WO 01/32721 | 5/2001 |

* cited by examiner

*Primary Examiner*—Caixia Lu
(74) *Attorney, Agent, or Firm*—Oblon, Spivak, McClelland, Maier & Neustadt, P.C.

(57) ABSTRACT

A solid catalyst for olefin polymerization, which comprises a silica carrier (A) having a specific surface area of from 600 to 850 m²/g, a pore volume of from 0.1 to 0.8 ml/g and an average particle size of from 2 to 12 μm, and an organoaluminum-oxy compound (B) and a Group IVB transition metal compound (C) containing a ligand having a cyclopentadienyl skeleton, supported on the carrier (A).

10 Claims, No Drawings

CATALYST FOR OLEFIN POLYMERIZATION AND PROCESS FOR POLYMERIZING OLEFIN BY MEANS THEREOF

The present invention relates to a solid catalyst for olefin polymerization and a process for producing an olefinic polymer using such a solid catalyst. More particularly, it relates to a solid catalyst for olefin polymerization that does not require deashing treatment because of having high polymerization activity and that is useful for efficiently producing an olefinic polymer which is excellent in powder properties such as high bulk density, narrow distribution of particle size and low content of large particles and fine powder and which further has a narrow molecular weight distribution, and a process for producing an olefinic polymer, which comprises polymerizing or copolymerizing an olefin using such a solid catalyst.

Many catalysts for olefin (co)polymerization comprising a zirconocene compound containing Group IVB transition metal in the periodic table and an organoaluminum-oxy compound, and processes for producing ethylene (co) polymers using such catalysts, have been proposed, for example, in JP-A-58-19309, JP-A-60-35006, etc. These catalysts are known to have high olefin polymerization activities in a solution polymerization system.

Further, various supported catalysts having at least one component of a metallocene compound and an organoaluminum-oxy compound supported on a porous inorganic oxide carrier such as alumina or silica/alumina, and methods for (co)polymerization of olefins using them, have been proposed. For example, JP-A-61-108610, JP-A-61-296008, etc., disclose a method for polymerizing an olefin in the presence of a catalyst having a metallocene compound and an organoaluminum-oxy compound supported on a carrier such as an inorganic oxide. Further, JP-A-63-280703, etc. disclose a method for preliminarily activating a catalyst by pre-polymerizing an olefin in the presence of a zirconocene compound, an organoaluminum-oxy compound, an organoaluminum compound and a carrier such as silica.

However, if it was attempted to polymerize or copolymerize an olefin in a slurry polymerization system or in a gas phase polymerization system using such a solid catalyst component as disclosed in such publications, the polymerization activities were remarkably low as compared with the above-mentioned solution polymerization system, and the bulk density of the formed polymer was not fully satisfactory.

On the other hand, a method of modifying an organoaluminum-oxy compound has been proposed for the purpose of improving the polymerization activities of the catalyst. For example, JP-A-6-329714 discloses a polymerization method for an olefin using an organoaluminum-oxy compound modified by a compound having an electron attractive group. Further, JP-A-2000-86672 discloses a polymerization method for an olefin using an organoaluminum-oxy compound obtained by contacting it with an adsorbent and then removing the adsorbent. These methods are capable of improving the polymerization activities, but have drawbacks such that an expensive compound is required for the modification, a part of the expensive organoaluminum-oxy compound is lost by the adsorption treatment or modification treatment, and a step for such modification treatment will be required anew, whereby taking industrialization into consideration, a substantial increase in the cost of the catalyst will be unavoidable.

Usually, an organoaluminum-oxy compound is supplied as a solution in a hydrocarbon solvent such as toluene or heptane. In a readily commercially available solution of an organoaluminum-oxy compound such as aluminoxane, an unreacted trialkylaluminum as a raw material (or an unreacted substance of a trialkylaluminum added for modification) is usually contained in an amount of from 14 to 35 mol % as calculated by Al atom, from the viewpoint of the storage stability of the organoaluminum-oxy compound or due to a difficulty in the production method. If such a commercially available organoaluminum-oxy compound is used to prepare a solid catalyst by means of an inorganic oxide carrier such as silica, which is usually widely employed, and if the solid catalyst thus obtained is used for polymerization of an olefin, there will be a problem such that the catalytic activities will substantially decrease, deposition in the reactor is likely, the molecular weight of the formed polymer will decrease, or the particle properties of the polymer will substantially deteriorate.

Accordingly, it has been necessary to remove the free trialkylaluminum in the organoaluminum-oxy compound solution in a step prior to supporting the organoaluminum-oxy compound on a carrier. Specifically, a solution of an organoaluminum-oxy compound in a hydrocarbon, which is commercially available or prepared by reacting a trialkylaluminum with water, is subjected to distillation to evaporate and remove the solvent and the trialkylaluminum under reduced pressure, and then, the obtained solid of the organoaluminum-oxy compound is redissolved in an organic solvent to be used. Such a preliminary step has had problems such as a loss of a part of the expensive organoaluminum-oxy compound due to formation of a gel by heating and so on, and an inconvenience in its practical use due to remarkable deterioration of the stability of organoaluminum-oxy compound from which the trialkylaluminum has been removed. These will lead to remarkably low productivity in the production for the catalyst and to substantially increasing of the cost of producing the catalyst, in the production of the polymer.

It is an object of the present invention to solve the above-mentioned problems of the prior art and to provide a solid catalyst for olefin polymerization which has high polymerization activities and is useful for efficiently producing an olefin polymer which is excellent in powder properties such as high bulk density, narrow distribution of particle size and low content of large particles and fine powder and which further has a narrow molecular weight distribution, even when e.g. a commercially available organoaluminum-oxy compound containing a trialkylaluminum, which is usually readily available, is used as it is.

The present inventors have conducted an extensive study and as a result, have found it possible to accomplish the above object with a solid catalyst for olefin polymerization in which silica ($SiO_2$) is used as a carrier material, and a specific carrier is used which has a specific surface area, a pore volume and an average particle size which are considered to be not necessarily desirable for a carrier, and a metallocene compound and an organoaluminum-oxy compound are supported on such a carrier.

Namely, according to the present invention, it is possible to obtain a solid catalyst for polymerization which has high polymerization activities even in slurry polymerization or gas phase polymerization and which not only is able to efficiently produce an olefinic polymer having a high bulk density, a narrow particle size distribution, excellent powder properties and a narrow molecular weight distribution, but also is free from deterioration of the catalytic activities without carrying out any particularly purification or the like even when a commercially available organoaluminum-oxy compound containing a trialkylaluminum compound, is used.

Thus, the present invention provides a solid catalyst for olefin polymerization, which comprises a silica carrier (A) having a specific surface area of from 600 to 850 m$^2$/g, a pore volume of from 0.1 to 0.8 ml/g and an average particle size of from 2 to 12 $\mu$m, and an organoaluminum-oxy compound (B) and a Group IVB transition metal compound (C) containing a ligand having a cyclopentadienyl skeleton, supported on the carrier (A).

Further, the present invention provides a method for producing an olefinic polymer, which comprises polymerizing or copolymerizing an olefin in the presence of the above-mentioned solid catalyst for olefin polymerization and an organoaluminum compound.

It is not clearly understood why such excellent effects can be accomplished by the present invention. However, the following points (1) to (4) may be mentioned, although such mechanisms by no means restrict the present invention.

(1) The silica carrier to be used in the present invention has a large number of hydroxyl groups on its surface. The large number of hydroxyl groups will increase the amount of the catalyst component to be supported, which serves advantageously for the olefin polymerization.

(2) In the carrier of the present invention, it is important that the carrier of the present invention has a specific surface area of from 600 to 850 m$^2$/g, a pore volume of from 0.1 to 0.8 cm$^3$/g and an average particle size of from 2 to 12 $\mu$m. When these characteristics are compared with a conventional preferred carrier having a specific surface area of from 50 to 500 m$^2$/g, a pore volume of from 0.3 to 3 cm$^3$/g and an average particle size of from 20 to 100 $\mu$m, as disclosed, for example, in JP-A-2000-86672, the specific surface area is apparently large, while the pore volume and the average particle size are small. A carrier having a large specific surface area usually has many sites to support the catalyst component and will thus form a catalyst having reactively active sites increased.

(3) Such a carrier of the present invention has increased sites to support the catalytic component, whereby as compared with a conventional carrier, a large amount of the catalytic component can be supported on its surface, whereby active sites for the polymerization reaction will be increased. Accordingly, in a case where an organoaluminum-oxy compound containing trimethyl aluminum which tends to reduce the catalytic activities, is supported on the carrier of the present invention, active sites on the carrier are many, and even if some of such active sites are lost by deposition of trimethyl aluminum on the surface, it still has an ability to support the organoaluminum-oxy compound as an effective catalyst component.

(4) A carrier having a large specific surface area and a small pore volume like in the present invention, consequently has a small pore diameter. In the case of such a carrier having a small pore diameter, trimethyl aluminum having a small molecular size will penetrate into the interior of the carrier even through such a small pore diameter. However, the aluminum-oxy compound having a large molecular size, as an effective catalyst component, will not penetrate into the interior of the carrier having such a small pore diameter and will deposit on a surface of the carrier. It is considered that as a result, with the carrier of the present invention, even when a commercially available aluminum-oxy compound containing a substantial amount of trimethyl aluminum which tends to reduce the catalytic activities, is used as a material for the catalyst, it is possible to obtain good catalytic activities under no influence of the trimethyl aluminum even if it is not preliminarily removed by a special treatment.

Now, the solid catalyst for olefin polymerization according to the present invention and the method for polymerizing an olefin using such a catalyst, will be specifically described. In the present invention, the term "polymerization" may be used for the meaning to include not only homopolymerization but also copolymerization, and the term "polymer" may be used for the meaning to include not only a homopolymer but also a copolymer.

The silica carrier (hereinafter referred to also as component (A)) to be used in the present invention may, for example, be silica alone or a mixture containing silica, such as SiO$_2$—MgO, SiO$_2$—Al$_2$O$_3$, SiO$_2$—TiO$_2$, SiO$_2$—V$_2$O$_5$, SiO$_2$—Cr$_2$O$_2$ or SiO$_2$—TiO$_2$—MgO. Such a carrier may have a small amount of water adsorbed or may have a small amount of impurities contained. However, it is preferably employed as calcined at a temperature of from 100 to 1,000° C., preferably from 150 to 700° C., in a stream of a dry gas such as air or nitrogen.

In the present invention, it is important that the above silica carrier satisfies the respective properties of the above-mentioned specific surface area, pore volume and average particle size.

The carrier is required to have a specific surface area of from 600 to 850 m$^2$/g. If the specific surface area is smaller than 600 m$^2$/g, a free trialkylaluminum in the organoaluminum-oxy compound is likely to react with hydroxyl groups on the surface of the carrier, whereby the catalyst component to be supported, can not adequately be supported. If the specific surface area is larger than 850 m$^2$/g, the number of hydroxyl groups on the surface tends to be too much, whereby a side reaction is likely to take place when the catalyst component is supported, and unreacted hydroxyl groups tend to be many, whereby the catalytic activities tend to decrease, such is being undesirable. It is particularly preferred that the specific surface area is at least 700 m$^2$/g and at most 800 m$^2$/g.

The carrier is required to have a pore volume of from 0.1 to 0.8 ml/g. If the pore volume is smaller than 0.1 ml/g, the catalyst component can not adequately be supported. If it exceeds 0.8 ml/g, the catalyst component tends to localize within pores, whereby no adequate catalytic activities can be obtained, and deposition of a polymer to the reactor is likely to result, and the bulk density of the formed polymer tends to be low. It is particularly preferred that the pore volume is at least 0.15 ml/g and at most 0.3 ml/g.

Further, the carrier is required to have an average particle size of from 2 to 12 $\mu$m. If the average particle size is smaller than 2 $\mu$m, the sedimentation rate of catalyst particles tends to be slow during the preparation of the solid catalyst, whereby there will be a problem in the productivity of the solid catalyst, or aggregation of the catalyst particles is likely to take place, whereby the morphology of the catalyst will be deteriorated, and fine powder or large particles tend to increase in the formed polymer, such being undesirable. On the other hand, if the average particle size exceeds 12 $\mu$m, the particle size of the formed polymer tends to extremely increase, whereby the bulk density or flowability tends to decrease, whereby clogging of the pipe line is likely to result during the production, or fisheyes tend to increase particularly when the polymer is used for films, such being undesirable. It is particularly preferred that the average particle size is at least 4 $\mu$m and at most 10 $\mu$m.

The carrier to be used in the present invention has the above specified specific surface area, pore volume and average particle size, and by these elements, the performance of the carrier of the present invention will be influenced. Accordingly, with respect to the pore diameter of the carrier of the present invention, its range is not particularly limited, so long as the carrier has the above specified specific surface area, pore volume and average particle size. However, the pore diameter is preferably from 0.1 to 6 nm, particularly preferably from 0.5 to 1.4 nm.

The organoaluminum-oxy compound (hereinafter referred to also as component (B)) to be used in the present invention, is selected from a linear alkylalminoxane of the following formula (3) or a cyclic alkylalminoxane of the formula (4):

(3)

wherein $R^3$ each represents a hydrogen atom, a halogen atom or a $C_{1-10}$ alkyl group, and e represents an integer of from 2 to 40, provided that when $R^3$ is a halogen atom, all $R^3$ are not simultaneously halogen atoms;

(4)

wherein $R^3$ and e are the same as defined in the above formula (3).

In a case where $R^3$ in the formula (3) or (4) is a $C_{1-10}$ alkyl group, specific examples of such an alkyl group include a methyl group, an ethyl group and an isobutyl group. Further, in a case where $R^3$ is a halogen atom, it may be a chlorine atom or a bromine atom. Further, the compound of the formula (3) or (4) may be one having different types of $R^3$ groups in the compound. Further, the number e of the repeating units is selected within a range of from 2 to 40, preferably within a range of from 5 to 30. Among these compounds of the formulae (3) and (4), those wherein all $R^3$ are methyl groups or at least one of $R^3$ is a methyl group, the rest being other groups, are preferred.

The organoaluminum-oxy compound (B) of the above formula (3) or (4) may be a conventional aluminoxane and may be produced, for example, by the following methods (1) to (3).

(1) A method in which a trialkylaluminum is added and reacted to a suspension in a hydrocarbon of a compound containing adsorbed water or a salt containing crystallization water, such as magnesium chloride hydrate, copper sulfate hydrate, aluminum sulfate hydrate, nickel sulfate hydrate or cerous chloride hydrate, and it is recovered in the form of a hydrocarbon solution.

(2) A method in which water, ice or steam is directly reacted to a trialkylaluminum in a medium such as benzene, toluene, ethyl ether or tetrahydrofuran, and it is recovered in the form of a hydrocarbon solution.

(3) A method in which a trialkylaluminum is reacted with an organic tin oxide such as dimethyltin oxide or dibutyltin oxide in a solvent such as decane, benzene or toluene.

The solvent to be used for the production of an organoaluminum-oxy compound may be a hydrocarbon solvent, for example, an aromatic hydrocarbon such as benzene, toluene, xylene, cumene or cymene, an aliphatic hydrocarbon such as pentane, hexane, heptane, octane, decane, dodecane, hexadecane or octadecene, an alicyclic hydrocarbon such as cyclopentane, cyclohexane, cyclooctane or methylcyclopentane, a petroleum fraction such as gasoline, kerosine oil or light oil, or a halide, particularly a chloride or bromide, of the above-mentioned aromatic hydrocarbon, aliphatic hydrocarbon or alicyclic hydrocarbon. As other solvents, ethers such as ethyl ether and tetrahydrofuran, may also be employed. Among these solvents, particularly preferred is an aromatic hydrocarbon.

Further, the solution of the organoaluminum-oxy compound may contain an unreacted trialkylaluminum, or, may be used as one which obtained by distilling to evaporate and to remove the solvent or the unreacted trialkylaluminum from the solution of the organoaluminum-oxy compound recovered by the above mentioned method, and then redissolving in a solvent.

Even if it is attempted to distill and remove the trialkylaluminum from the solution of the organoaluminum-oxy compound, finally, about 10 mol %, as calculated by aluminum atom, of the trialkylaluminum will remain in the solution of the organoaluminum-oxy compound, and the content can not be reduced any further by a similar operation. However, with such a solution of the organoaluminum-oxy compound wherein the trialkylaluminum is contained in an amount of about 10 mol %, there is no possibility that the trialkylaluminum will be freed in the reaction system during the production of a catalyst, and accordingly, it will cause no problem in the step of supporting the compound on an oxide to prepare a supported catalyst or from the viewpoint of the catalytic performance. However, on the other hand, the solution of an organoaluminum-oxy compound having a trialkylaluminum content of about 10 mol % is likely to form a gel, whereby there will be a case where a serious problem will be caused from the viewpoint of the storage stability.

On the other hand, as the trialkylaluminum content in the organoaluminum-oxy compound exceeds 10 mol %, a free trialkylaluminum will also increase. With the solution of an organoaluminum-oxy compound having such a large amount of free trialkylaluminum, formation of a gel is suppressed, which is advantageous from the viewpoint of the storage stability. However, if it is attempted to produce a supported catalyst by supporting the solution of the organoaluminum-oxy compound containing an organoaluminum having a trialkylaluminum content exceeding 10 mol %, on a commonly widely used inorganic oxide carrier (such as a silica having a specific surface area within a range of from 250 to 400 $m^2/g$ and a pore volume exceeding 0.8 ml/g), the organoaluminum-oxy compound required, can not be supported on the carrier in a sufficient amount, whereby the catalytic activities will be remarkably low. Further, if polymerization of an olefin is carried out using a metallocene-supported catalyst thus obtained, a problem such as deposition of the polymer on the polymerizer, a decrease in the molecular weight of the formed polymer, or a remarkable deterioration in the particle properties of the polymer, is likely to result.

If the trialkylaluminum content in the organoaluminum-oxy compound exceeds 15 mol %, the above-mentioned problem relating to a solid catalyst will become worse, and if it exceeds 20 mol %, depending upon the carrier, there may be a case where no substantial catalytic activities can be obtained.

A readily available commercial product of a solution of an aluminum-oxy compound such as methylaluminoxane, usually contains trimethyl aluminum in an amount of from 14 to 35 mol % as calculated by Al atom. Advantageously, in the present invention, such a solution can suitably be used without carrying out any special pretreatment such as purification, in a case where the trimethyl aluminum content is not more than 35 mol %.

The content of trimethyl aluminum (hereinafter sometimes referred to as "TMAL") in the solution of methylaluminoxane may, for example, be calculated from the area of a sharp peak attributable to hydrogen of trimethyl aluminum as observed in the vicinity of −0.4 ppm, and from the area of a wide peak attributable to hydrogen of methylaluminoxane as observed from 0.45 to −0.4 ppm in the $^1$H NMR spectrum measured at room temperature in a solvent mixture of deuterated dioxane and deuterated benzene.

The Group IVB transition metal compound (C) containing a ligand having a cyclopentadienyl skeleton (hereinafter sometimes referred to as component (C)) to be used in the present invention, may be a compound of the formula (1) or (2):

$$(R^1{}_aCp)_m(R^2{}_bCp)_nM(Y)_{4-(m+n)} \quad (1)$$

wherein M represents titanium, zirconium or hafnium, Cp represents a group having a cyclopentadienyl skeleton, each of $R^1$ and $R^2$ represents a hydrogen atom, an alkyl group, an alkenyl group, an aryl group, an alkylaryl group, an arylalkyl group or an alkylsilyl group, Y represents a halogen atom, a hydrogen atom, a hydrocarbon group, an alkylsilyl group, or an aryloxy group substituted by a halogen atom, a hydrocarbon group, an alkylsilyl group, a halogenated hydrocarbon group, a nitrogen-containing organic group, an oxygen-containing organic group or a sulfur-containing organic group, each of a and b is an integer of from 0 to 5, and each of m and n is an integer of from 0 to 3, provided that m+n is an integer of from 1 to 3;

$$R'(R^1{}_cCp)(R^2{}_dCp)M(Y)_2 \quad (2)$$

wherein M represents titanium, zirconium or hafnium, Cp represents a group having a cyclopentadienyl skeleton, each of $R^1$ and $R^2$ represents a hydrogen atom, an alkyl group, an alkenyl group, an aryl group, an alkylaryl group, an arylalkyl group or an alkylsilyl group, R' represents a divalent group which links $(R^1{}_cCp)$ and $(R^2{}_dCp)$, selected from the group consisting of an alkylene group, an arylalkylene group, a dialkylsilylene group, a dialkylgermylene group, an alkylphosphinediyl group and an alkylimino group, Y represents a halogen atom, a hydrogen atom, a hydrocarbon group, an alkylsilyl group, or an aryloxy group substituted by a halogen atom, a hydrocarbon group, an alkylsilyl group, a halogenated hydrocarbon group, a nitrogen-containing organic group, an oxygen-containing organic group or a sulfur-containing organic group, and each of c and d is an integer of from 0 to 4.

In the formula (1) or (2), the Cp group as a ligand is not particularly limited so long as it is a group having a cyclopentadienyl skeleton. The cyclopentadienyl group, of course, includes a cyclopentadienyl group in which adjacent two carbon atoms of a cyclopentadienyl ring are bonded to other carbon atoms to form a 4-, 5- or 6-membered ring. Such a cyclopentadienyl group in which adjacent two carbon atoms of a cyclopentadienyl ring are bonded to other carbon atoms to form a 4-, 5- or 6-membered ring, may specifically be e.g. an indenyl group, a tetrahydroindenyl group or a fluorenyl group.

Further, in the formula (1) or (2), each of $R^1$ and $R^2$, when it is other than a hydrogen atom, is preferably a $C_{1-20}$ alkyl group, a $C_{2-20}$ alkenyl group, a $C_{6-20}$ aryl group, a $C_{7-20}$ alkylaryl group, a $C_{7-20}$ arylalkyl group or a $C_{3-20}$ alkylsilyl group.

In the formula (1), the group $R^1{}_aCp$ and $R^2{}_bCp$ having a cyclopentadienyl skeleton may, for example, be a cyclopentadienyl group, a methylcyclopentadienyl group, an ethylcyclopentadienyl group, a n-propylcyclopentadienyl group, an isopropylcyclopentadienyl group, a n-butylcyclopentadienyl group, an isobutylcyclopentadienyl group, a tert-butylcyclopentadienyl group, a 1,2-dimethylcyclopentadienyl group, a 1,3-dimethylcyclopentadienyl group, a 1,2,4-trimethylcyclopentadienyl group, a 1,2,3-trimethylcyclopentadienyl group, a tetramethylcyclopentadienyl group, a pentamethylcyclopentadienyl group, a trimethylsilylcyclopentadienyl group, a trimethylsilyltetramethylcyclopentadienyl group, a (phenyldimethylsilyl)cyclopentadienyl group, a triphenylsilylcyclopentadienyl group, a 1,3-bis(trimethylsilyl)cyclopentadienyl group, a cyclohexylcyclopentadienyl group, an allylcyclopentadienyl group, a benzylcyclopentadienyl group, a phenylcyclopentadienyl group, a tolylcyclopentadienyl group, an indenyl group, a 1-methylindenyl group, a 2-methylindenyl group, a 2,4-dimethylindenyl group, a 4,7-dimethoxyindenyl group, a 4,7-dichloroindenyl group, a 5,6-dimethylindenyl group, a 2-methyl-4-ethylindenyl group, a 2-methyl-4,6-diisopropyl-indenyl group, a naphthylindenyl group, a 4,5,6,7-tetrahydroindenyl group, a 2-methyl-tetrahydroindenyl group, a fluorenyl group or a 2,7-di-tert-butylfluorenyl group.

Further, in the formula (2), R' is a $C_{1-2}$ divalent group which links $(R^1{}_aCp)$ and $(R^2{}_bCp)$, and specifically, it may, for example, be an alkylene group such as a methylene group or an ethylene group; an alkylidene group such as an ethylidene group, a propylidene group or an isopropylidene group; an arylalkylidene group such as a phenylmethylidene group or a diphenylmethylidene group; a silylene group such as a dimethylsilylene group, a diethylsilylene group, a dipropylsilylene group, a diisopropylsilylene group, a methylethylsilylene group, a methylisopropylsilylene group, a methyl-tert-butyl silylene group, a methylphenylsilylene group or a diphenylsilylene group; a germylene group such as a dimethylgermylene group, a diethylgermylene group, a dipropylgermylene group, a diisopropylgermylene group, a diphenylgermylene group, a methylethylgermylene group, a methylisopropylgermylene group, a methyl-tert-butylgermylene group, a methylphenylgermylene group or a diphenylgermylene group; an alkylphosphinediyl group such as a methylphosphinediyl group; an alkylimino group such as a methylimino group; or an alkylboranediyl group such as a methylboranediyl group.

And, in the formula (2), the group $R'(R^1{}_aCp)(R^2{}_bCp)$ having a cyclopentadienyl skeleton, may, for example, be an ethylenebisindenyl group, a diphenylmethylenebisindenyl group, a dimethylsilylenebisindenyl group, an isopropylidenebisindenyl group, a dimethylsilylenebistetrahydroindenyl group, an isopropylidenecyclopentadienyl-1-fluorenyl group, a diphenylmethylenecyclopentadienyl-1-fluorenyl group, a dimethylsilylenecyclopentadienyl-1-fluorenyl group, a dimethylsilylenebis(2,3,5-trimethylcyclopentadienyl) group, a dimethylsilylenebis(2,4-dimethylcyclopentadienyl) group, a dimethylsilylenebis(3-methylcyclopentadienyl) group, an isopropylidenecyclopentadienyl-methylcyclopentadienyl group, an isopropylidenecyclopentadienyl-2,3,5-trimethylcyclopentadienyl group, a diphenylmethylenecyclopentadienyl-methylcyclopentadienyl group, a diphenylmethylenecyclopentadienyl-2,4-dimethylcyclopentadienyl group, a diphenylmethylenecyclopentadienyl-2,3,5-trimethylcyclopentadienyl group, a dimethylsilylenecyclopentadienyl-methylcyclopentadienyl group, a dimethylsilylenecyclopentadienyl-2,4-dimethylcyclopentadienyl group, a dimethylsilylenecyclopentadienyl-2,3,5-trimethylcyclopentadienyl group, an isopropylidene-2,4-dimethylcyclopentadienyl-1-fluorenyl group, a diphenylmethylene-2,4-dimethylcyclopentadienyl-1-fluorenyl group, a dimethylsilylene-2,4-dimethylcyclopentadienyl-1-fluorenyl group, a cyclohexylidenecyclopentadienyl-1-fluorenyl group or dimethylgermylenebis-1-indenyl group.

The metallocene compounds according to the definition of the formula (1) mentioned above may be exemplified by the following compounds which have various aryloxy groups or substituted aryloxy groups, as the group Y in the formula. Dicyclopentadienylbis(2-fluorophenoxy)zirconium, dicyclopentadienylbis(3-fluorophenoxy)zirconium, dicyclopentadienylbis(4-fluorophenoxy)zirconium, dicyclopentadienylbis(2-chlorophenoxy)zirconium, dicyclopentadienylbis(3-chlorophenoxy)zirconium, dicyclopentadienylbis(4-chlorophenoxy)zirconium, dicyclopentadienylbis(2-bromophenoxy)zirconium, dicyclopentadienylbis(3-bromophenoxy)zirconium, dicyclopentadienylbis(4-bromophenoxy)zirconium, dicyclopentadienylbis(2-iodophenoxy)zirconium, dicyclopentadienylbis(3-iodophenoxy)zirconium, dicyclopentadienylbis(4-iodophenoxy)zirconium, dicyclopentadienylbis(2,3-difluorophenoxy)zirconium, dicyclopentadienylbis(2,4-difluorophenoxy)zirconium, dicyclopentadienylbis(2,5-difluorophenoxy)zirconium, dicyclopentadienylbis(2,6-difluorophenoxy)zirconium, dicyclopentadienylbis(3,4-difluorophenoxy)zirconium, dicyclopentadienylbis(3,5-difluorophenoxy)zirconium, dicyclopentadienylbis(2,3-dichlorophenoxy)zirconium, dicyclopentadienylbis(2,4-dichlorophenoxy)zirconium, dicyclopentadienylbis(2,5-dichlorophenoxy)zirconium, dicyclopentadienylbis(2,6-dichlorophenoxy)zirconium, dicyclopentadienylbis(3,4-dichlorophenoxy)zirconium, dicyclopentadienylbis(3,5-dichlorophenoxy)zirconium, dicyclopentadienylbis(2,3,4-trifluorophenoxy)zirconium, dicyclopentadienylbis(2,3,5-trifluorophenoxy)zirconium, dicyclopentadienylbis(2,3,6-trifluorophenoxy)zirconium, dicyclopentadienylbis(2,4,5-trifluorophenoxy)zirconium, dicyclopentadienylbis(2,4,6-trifluorophenoxy)zirconium, dicyclopentadienylbis(3,4,5-trifluorophenoxy)zirconium, dicyclopentadienylbis(2,3,5,6-tetrafluorophenoxy)zirconium, dicyclopentadienylbis(pentafluorophenoxy)zirconium, dicyclopentadienylbis(2-fluoromethylphenoxy)zirconium, dicyclopentadienylbis(3-fluoromethylphenoxy)zirconium, dicyclopentadienylbis(4-fluoromethylphenoxy)zirconium, dicyclopentadienylbis(2-chloromethylphenoxy)zirconium, dicyclopentadienylbis(3-chloromethylphenoxy)zirconium, dicyclopentadienylbis(4-chloromethylphenoxy)zirconium, dicyclopentadienylbis(2-trifluoromethylphenoxy)zirconium, dicyclopentadienylbis(3-trifluoromethylphenoxy)zirconium, dicyclopentadienylbis(4-trifluoromethylphenoxy)zirconium, dicyclopentadienylbis(3,5-bis(trifluoromethyl)phenoxy)zirconium, dicyclopentadienylbis(2-(2,2,2-trifluoroethyl)phenoxy)zirconium, dicyclopentadienylbis(3-(2,2,2-trifluoroethyl)phenoxy)zirconium, dicyclopentadienylbis(4-(2,2,2-trifluoroethyl)phenoxy)zirconium, dicyclopentadienylbis(2-trichloromethylphenoxy)zirconium, dicyclopentadienylbis(3-trichloromethylphenoxy)zirconium, dicyclopentadienylbis(4-trichloromethylphenoxy)zirconium, dicyclopentadienylbis(2-methylphenoxy)zirconium, dicyclopentadienylbis(3-methylphenoxy)zirconium, dicyclopentadienylbis(4-methylphenoxy)zirconium, dicyclopentadienylbis(2,3-dimethylphenoxy)zirconium, dicyclopentadienylbis(2,4-dimethylphenoxy)zirconium, dicyclopentadienylbis(2,5-dimethylphenoxy)zirconium, dicyclopentadienylbis(2,6-dimethylphenoxy)zirconium, dicyclopentadienylbis(3,4-dimethylphenoxy)zirconium, dicyclopentadienylbis(3,5-dimethylphenoxy)zirconium, dicyclopentadienylbis(2,3,4-trimethylphenoxy)zirconium, dicyclopentadienylbis(2,3,5-trimethylphenoxy)zirconium, dicyclopentadienylbis(2,3,6-trimethylphenoxy)zirconium, dicyclopentadienylbis(2,4,5-trimethylphenoxy)zirconium, dicyclopentadienylbis(2,4,6-trimethylphenoxy)zirconium, dicyclopentadienylbis(3,4,5-trimethylphenoxy)zirconium, dicyclopentadienylbis(pentamethylphenoxy)zirconium, dicyclopentadienylbis(2-methyl-4-fluorophenoxy)zirconium, dicyclopentadienylbis(2-chloro-4-fluorophenoxy)zirconium, dicyclopentadienylbis(2-chloro-4-trifluoromethylphenoxy)zirconium, dicyclopentadienylbis(2-fluoro-4-trifluoromethylphenoxy)zirconium, dicyclopentadienylbis(2-trifluoromethyl-4-fluorophenoxy)zirconium, dicyclopentadienylbis(2-ethylphenoxy)zirconium, dicyclopentadienylbis(3-ethylphenoxy)zirconium, dicyclopentadienylbis(4-ethylphenoxy)zirconium, dicyclopentadienylbis(2-isopropylphenoxy)zirconium, dicyclopentadienylbis(3-isopropylphenoxy)zirconium, dicyclopentadienylbis(4-isopropylphenoxy)zirconium, dicyclopentadienylbis(2-tert-butylphenoxy)zirconium, dicyclopentadienylbis(3-tert-butylphenoxy)zirconium, dicyclopentadienylbis(4-tert-butylphenoxy)zirconium, dicyclopentadienylbis(3,5-di-tert-butylphenoxy)zirconium, dicyclopentadienylbis(2,8-dimethyl-1-naphthoxy)zirconium, dicyclopentadienylbis(1-tert-butyl-2-naphthoxy)zirconium, dicyclopentadienylbis(8-bromo-2-naphthoxy)zirconium, dicyclopentadienylbis(2-phenylphenoxy)zirconium, dicyclopentadienylbis(3-phenylphenoxy)zirconium, dicyclopentadienylbis(4-phenylphenoxy)zirconium, dicyclopentadienylbis(2-benzylphenoxy)zirconium, dicyclopentadienylbis(2-methoxycarbonylphenoxy)zirconium, dicyclopentadienylbis(2-acetoxyphenoxy)zirconium, dicyclopentadienylbis(2-cyanophenoxy)zirconium, dicyclopentadienylbis(2-nitrophenoxy)zirconium, dicyclopentadienylbis(2-dimethylaminophenoxy)zirconium, dicyclopentadienylbis(2-trifluoromethanesulfonylphenoxy)zirconium, dicyclopentadienylbis(4-fluorothiophenoxy)zirconium, dicyclopentadienylbis(2-trifluoromethylthiophenoxy)zirconium, dicyclopentadienylbis(3-trifluoromethylthiophenoxy)zirconium, bis(methylcyclopentadienyl)bis(2-chlorophenoxy)zirconium, bis(methylcyclopentadienyl)bis(2-trifluoromethylphenoxy)zirconium, bis(1,2-dimethylcyclopentadienyl)bis(2-ethylphenoxy)zirconium, bis(1,3-dimethylcyclopentadienyl)bis(2-trifluoromethylphenoxy)zirconium, bis(1,3-dimethylcyclopentadienyl)bis(3-tert-butylphenoxy)zirconium, bis(1,2,3-trimethylcyclopentadienyl)bis(2-fluorophenoxy)zirconium, bis(1,2,3-trimethylcyclopentadienyl)bis(3-fluorophenoxy)zirconium, bis(1,2,3-trimethylcyclopentadienyl)bis(4-fluorophenoxy)zirconium, bis(1,2,3-trimethylcyclopentadienyl)bis(2-isopropylphenoxy)zirconium, bis(1,2,4-trimethylcyclopentadienyl)bis(2-trifluoromethylphenoxy)zirconium, bis(1,2,4-trimethylcyclopentadienyl)bis(2-methylphenoxy)

zirconium, bis(1,2,4-trimethylcyclopentadienyl)bis(3-methylphenoxy)zirconium, bis(1,2,4-trimethylcyclopentadienyl)bis(4-methylphenoxy)zirconium, bis(1,2,4-trimethylcyclopentadienyl)bis(2,4-dimethylphenoxy)zirconium, bis(1,2,4-trimethylcyclopentadienyl)bis(2,4-dichlorophenoxy)zirconium, bis(1,2,4-trimethylcyclopentadienyl)bis(2-tert-butylphenoxy)zirconium, bis(1,2,4-trimethylcyclopentadienyl)bis(3-tert-butylphenoxy)zirconium, bis(1,2,4-trimethylcyclopentadienyl)bis(4-tert-butylphenoxy)zirconium, bis(1,2,3,4-tetramethylcyclopentadienyl)bis(2-methoxyphenoxy)zirconium, bis(1,2,3,4-tetramethylcyclopentadienyl)bis(3-methoxyphenoxy)zirconium, bis(1,2,3,4-tetramethylcyclopentadienyl)bis(4-methoxyphenoxy)zirconium, bis(1,2,3,4-tetramethylcyclopentadienyl)bis(2-iodophenoxy)zirconium, bis(1,2,3,4-tetramethylcyclopentadienyl)bis(3-iodophenoxy)zirconium, bis(1,2,3,4-tetramethylcyclopentadienyl)bis(4-iodophenoxy)zirconium, bis(1,2,3,4-tetramethylcyclopentadienyl)bis(2-thiomethylphenoxy)zirconium, bis(1,2,3,4-tetramethylcyclopentadienyl)bis(3-thiomethylphenoxy)zirconium, bis(1,2,3,4-tetramethylcyclopentadienyl)bis(4-thiomethylphenoxy)zirconium, bis(pentamethylcyclopentadienyl)bis(2-fluorophenoxy)zirconium, bis(pentamethylcyclopentadienyl)bis(3-fluorophenoxy)zirconium, bis(pentamethylcyclopentadienyl)bis(4-fluorophenoxy)zirconium, bis(ethylcyclopentadienyl)bis(2-ethylphenoxy)zirconium, bis(ethylcyclopentadienyl)bis(3-ethylphenoxy)zirconium, bis(ethylcyclopentadienyl)bis(4-ethylphenoxy)zirconium, bis(isopropylcyclopentadienyl)bis(2-acetylphenoxy)zirconium, bis(isopropylcyclopentadienyl)bis(3-acetylphenoxy)zirconium, bis(isopropylcyclopentadienyl)bis(4-acetylphenoxy)zirconium, bis(isopropylcyclopentadienyl)bis(2-methylphenoxy)zirconium, bis(isopropylcyclopentadienyl)bis(3-methylphenoxy)zirconium, bis(isopropylcyclopentadienyl)bis(4-methylphenoxy)zirconium, bis(n-butylcyclopentadienyl)bis(2-chlorophenoxy)zirconium, bis(n-butylcyclopentadienyl)bis(3-chlorophenoxy)zirconium, bis(n-butylcyclopentadienyl)bis(4-chlorophenoxy)zirconium, bis(n-butylcyclopentadienyl)bis(2-trifluoromethylphenoxy)zirconium, bis(n-butylcyclopentadienyl)bis(3-trifluoromethylphenoxy)zirconium, bis(n-butylcyclopentadienyl)bis(4-trifluoromethylphenoxy)zirconium, bis(n-butylcyclopentadienyl)bis(2-tert-butylphenoxy)zirconium, bis(n-butylcyclopentadienyl)bis(3-tert-butylphenoxy)zirconium, bis(n-butylcyclopentadienyl)bis(4-tert-butylphenoxy)zirconium, bis(n-butylcyclopentadienyl)bis(2-cyanophenoxy)zirconium, bis(n-butylcyclopentadienyl)bis(3-cyanophenoxy)zirconium, bis(n-butylcyclopentadienyl)bis(4-cyanophenoxy)zirconium, bis(tert-butylcyclopentadienyl)bis(2-fluorophenoxy)zirconium, bis(tert-butylcyclopentadienyl)bis(3-fluorophenoxy)zirconium, bis(tert-butylcyclopentadienyl)bis(4-fluorophenoxy)zirconium, bis(tert-butylcyclopentadienyl)bis(2-ethylphenoxy)zirconium, bis(tert-butylcyclopentadienyl)bis(3-ethylphenoxy)zirconium, bis(tert-butylcyclopentadienyl)bis(4-ethylphenoxy)zirconium, bis(tert-butylcyclopentadienyl)bis(2,4-dimethylphenoxy)zirconium, bis(1,3-di-tert-butylcyclopentadienyl)bis(2-chlorophenoxy)zirconium, bis(1,3-di-tert-butylcyclopentadienyl)bis(3-chlorophenoxy)zirconium, bis(1,3-di-tert-butylcyclopentadienyl)bis(4-chlorophenoxy)zirconium, bis(1,3-di-tert-butylcyclopentadienyl)bis(2-trifluoromethylphenoxy)zirconium, bis(1,3-di-tert-butylcyclopentadienyl)bis(3-trifluoromethylphenoxy)zirconium, bis(1,3-di-tert-butylcyclopentadienyl)bis(4-trifluoromethylphenoxy)zirconium, bis(phenylcyclopentadienyl)bis(2-phenylphenoxy)zirconium, bis(phenylcyclopentadienyl)bis(3-phenylphenoxy)zirconium, bis(phenylcyclopentadienyl)bis(4-phenylphenoxy)zirconium, bisphenylcyclopentadienyl)bis(2,4-dichlorophenoxy)zirconium, bis(trimethylsilylcyclopentadienyl)bis(2-tert-butoxyphenoxy)zirconium, bis(trimethylsilylcyclopentadienyl)bis(3-tert-butoxyphenoxy)zirconium, bis(trimethylsilylcyclopentadienyl)bis(4-tert-butoxyphenoxy)zirconium, bis(trimethylsilylcyclopentadienyl)bis(2-phenylphenoxy)zirconium, bis(trimethylsilylcyclopentadienyl)bis(3-phenylphenoxy)zirconium, bis(trimethylsilylcyclopentadienyl)bis(4-phenylphenoxy)zirconium, bis(trimethylsilylcyclopentadienyl)bis(2,4-difluorophenoxy)zirconium, bis(cyclohexylcyclopentadienyl)bis(2-iodophenoxy)zirconium, bis(cyclohexylcyclopentadienyl)bis(3-iodophenoxy)zirconium, bis(cyclohexylcyclopentadienyl)bis(4-iodophenoxy)zirconium, bis(indenyl)bis(2-methylphenoxy)zirconium, bis(indenyl)bis(3-methylphenoxy)zirconium, bis(indenyl)bis(4-methylphenoxy)zirconium, bis(1-methylindenyl)bis(2-fluorophenoxy)zirconium, bis(1-methylindenyl)bis(3-fluorophenoxy)zirconium, bis(1-methylindenyl)bis(4-fluorophenoxy)zirconium, bis(2-methylindenyl)bis(2-bromophenoxy)zirconium, bis(2-methylindenyl)bis(3-bromophenoxy)zirconium, bis(2-methylindenyl)bis(4-bromophenoxy)zirconium, bis(5,6-dimethylindenyl)bis(2-isopropylphenoxy)zirconium, bis(5,6-dimethylindenyl)bis(3-isopropylphenoxy)zirconium, bis(5,6-dimethylindenyl)bis(4-isopropylphenoxy)zirconium, bis(5,6-dimethoxyindenyl)bis(3-cyanophenoxy)zirconium, bis(5,6-dimethoxyindenyl)bis(4-cyanophenoxy)zirconium, bis(fluorenyl)bis(2-chlorophenoxy)zirconium, bis(fluorenyl)bis(3-chlorophenoxy)zirconium, bis(fluorenyl)bis(4-chlorophenoxy)zirconium, bis(4,5,6,7-tetrahydroindenyl)bis(2-tert-butylphenoxy)zirconium, bis(4,5,6,7-tetrahydroindenyl)bis(3-tert-butylphenoxy)zirconium, bis(4,5,6,7-tetrahydroindenyl)bis(4-tert-butylphenoxy)zirconium, bis(2-methyl-4,5,6,7-tetrahydroindenyl)bis(2-nitrophenoxy)zirconium, bis(2-methyl-4,5,6,7-tetrahydroindenyl)bis(3-nitrophenoxy)zirconium, bis(2-methyl-4,5,6,7-tetrahydroindenyl)bis(4-nitrophenoxy)zirconium, bis(2,7-di-tert-butylfluorenyl)bis(2-trifluoromethylphenoxy)zirconium, bis(2,7-di-tert-butylfluorenyl)bis(3-trifluoromethylphenoxy)zirconium, bis(2,7-di-tert-butylfluorenyl)bis(4-trifluoromethylphenoxy)zirconium, etc.

Further, in the present invention, as the compound of the formula (1), metallocene compounds of the formula (1) wherein the group Y is a chlorine atom, a bromine atom, a hydrogen atom, a methyl group, an ethyl group, a phenyl group or the like, may also be used in addition to the above exemplified ones. They may, for example, be dicyclopentadienylzirconium monochloride monohydride, dicyclopentadienylzirconium monobromide monohydride, dicyclopentadienylmethylzirconium hydride, dicyclopentadienylethylzirconium hydride, dicyclopentadienylphenylzirconium hydride, dicyclopentadienylbenzylzirconium hydride, dicyclopentadienylneopentylzirconium hydride, bis(methylcyclopentadienyl)zirconium monochloride monohydride, bis(indenyl)zirconium monochloride monohydride, dicyclopentadienylzirconium dichloride, dicyclopentadienylzirconium dibromide, dicyclopentadienylmethylzirconium monochloride, dicyclopentadienylethylzirconium monochloride, dicyclopentadienylcyclohexylzirconium monochloride, dicyclopentadienylphenylzirconium monochloride, dicyclopentadienylbenzylzirconium monochloride, bis(dimethylcyclopentadienyl)zirconium dichloride, bis(trimethylcyclopentadienyl)zirconium dichloride, bis(butylcyclopentadienyl)zirconium dichloride, dicyclopentadienylzirconium dimethyl, dicyclopentadienylzirconium diphenyl, dicyclopentadienylzirconium dibenzyl, bis(indenyl)zirconium dichloride, bis(indenyl)zirconium dibromide, bis(fluorenyl)zirconium dichloride, etc.

Further, as the compound of the formula (1) of the present invention, in addition to the above-mentioned various metallocene compounds, metallocene compounds of the formula (1) wherein M is changed from the zirconium atom to a titanium atom or a hafnium atom, may likewise be used.

On the other hand, as the metallocene compound of the formula (2), the following compounds in which the group Y in the formula is one of various phenoxy groups, may be exemplified. Namely, ethylenebis(indenyl)bis(4-trifluoromethylphenoxy)zirconium, ethylenebis(indenyl)bis(4-fluorophenoxy)zirconium, ethylenebis(indenyl)bis(4-chlorophenoxy)zirconium, ethylenebis(indenyl)bis(2-fluorophenoxy)zirconium, ethylenebis(3-methylindenyl)bis(4-trifluoromethylphenoxy)zirconium, ethylenebis(3-methylindenyl)bis(4-fluorophenoxy)zirconium, ethylenebis(3-methylindenyl)bis(4-chlorophenoxy)zirconium, ethylenebis(3-methylindenyl)bis(2-fluorophenoxy)zirconium, ethylenebis(5,6-dimethylindenyl)bis(4-trifluoromethylphenoxy)zirconium, ethylenebis(5,6-dimethylindenyl)bis(4-fluorophenoxy)zirconium, ethylenebis(5,6-dimethylindenyl)bis(4-chlorophenoxy)zirconium, ethylenebis(5,6-dimethylindenyl)bis(2-fluorophenoxy)zirconium, ethylenebis(4,7-dimethylindenyl)bis(4-trifluoromethylphenoxy)zirconium, ethylenebis(4,7-dimethylindenyl)bis(4-fluorophenoxy)zirconium, ethylenebis(5,6-dimethoxyindenyl)bis(4-trifluoromethylphenoxy)zirconium, ethylenebis(5,6-dimethoxyindenyl)bis(4-fluorophenoxy)zirconium, ethylenebis(5,6-dihydroindenyl)bis(4-trifluoromethylphenoxy)zirconium, ethylenebis(5,6-dihydroindenyl)bis(4-fluorophenoxy)zirconium, ethylenebis(5,6-dihydroindenyl)bis(4-chlorophenoxy)zirconium, ethylenebis(5,6-dihydroindenyl)bis(2-fluorophenoxy)zirconium, ethylenebis(4,5,6,7-tetrahydroindenyl)bis(4-trifluoromethylphenoxy)zirconium, ethylenebis(4,5,6,7-tetrahydroindenyl)bis(4-fluorophenoxy)zirconium, ethylenebis(4,5,6,7-tetrahydroindenyl)bis(4-chlorophenoxy)zirconium, ethylenebis(4,5,6,7-tetrahydroindenyl)bis(2-fluorophenoxy)zirconium, methylenebis(cyclopentadienyl)bis(2-fluorophenoxy)zirconium, methylenebis(cyclopentadienyl)bis(2-ethylphenoxy)zirconium, methylenebis(methylcyclopentadienyl)bis(3-chlorophenoxy)zirconium, methylenebis (1,3-dimethylcyclopentadienyl)bis(2-trifluoromethylphenoxy)zirconium, methylenebis(n-butylcyclopentadienyl)bis(4-tert-butylphenoxy)zirconium, ethylenebis(3-methylcyclopentadienyl)bis(4-trifluoromethylphenoxy)zirconium, ethylenebis(3-methylcyclopentadienyl)bis(4-fluorophenoxy)zirconium, ethylenebis(3-isopropylcyclopentadienyl)bis(4-trifluoromethylphenoxy)zirconium, ethylenebis(3-isopropylcyclopentadienyl)bis(4-fluorophenoxy)zirconium, ethylenebis(3-tert-butylcyclopentadienyl)bis(4-trifluoromethylphenoxy)zirconium, ethylenebis(3-tert-butylcyclopentadienyl)bis(4-fluorophenoxy)zirconium, isopropylidene(cyclopentadienyl)(indenyl)bis(4-trifluoromethylphenoxy)zirconium, isopropylidene(cyclopentadienyl)(indenyl)bis(4-fluorophenoxy)zirconium, isopropylidene(methylcyclopentadienyl)(indenyl)bis(4-trifluoromethylphenoxy)zirconium, isopropylidene(methylcyclopentadienyl)(indenyl)bis(4-fluorophenoxy)zirconium, isopropylidenebis(indenyl)bis(4-trifluoromethylphenoxy)zirconium, isopropylidenebis(indenyl)bis(4-fluorophenoxy)zirconium, isopropylidene(cyclopentadienyl)(fluolenyl)bis(4-trifluoromethylphenoxy)zirconium, isopropylidene(cyclopentadienyl)(fluolenyl)bis(4-fluorophenoxy)zirconium, isopropylidene(3-methylcyclopentadienyl)(fluolenyl)bis(4-trifluoromethylphenoxy)zirconium, isopropylidene(3-methylcyclopentadienyl)(fluolenyl)bis(4-fluorophenoxy)zirconium, tetramethylethylidenebis(2-tert-butylcyclopentadienyl)bis(4-trifluoromethylphenoxy)zirconium, tetramethylethylidenebis(2-tert-butylcyclopentadienyl)bis(4-fluorophenoxy)zirconium, dimethylsilylenebis(indenyl)bis(4-trifluoromethylphenoxy)zirconium, dimethylsilylenebis(indenyl)bis(4-fluorophenoxy)zirconium, dimethylsilylenebis(2-methylindenyl)bis(4-trifluoromethylphenoxy)zirconium, dimethylsilylenebis(2-methylindenyl)bis(4-fluorophenoxy)zirconium, dimethylsilylenebis(2-ethylindenyl)bis(4-trifluoromethylphenoxy)zirconium, dimethylsilylenebis(2-ethylindenyl)bis(4-fluorophenoxy)zirconium, dimethylsilylenebis(2-methyl5-isopropylindenyl)bis(4-trifluoromethylphenoxy)zirconium, dimethylsilylenebis(2-methyl-5-isopropylindenyl)bis(4-fluorophenoxy)zirconium, dimethylsilylenebis(4,5,6,7-tetrahydroindenyl)bis(4-trifluoromethylphenoxy)zirconium, dimethylsilylenebis(4,5,6,7-tetrahydroindenyl)bis(4-fluorophenoxy)zirconium, dimethylsilylenebis(2-tert-butylcyclopentadienyl)bis(4-trifluoromethylphenoxy)zirconium, dimethylsilylenebis(2-tert-butylcyclopentadienyl)bis(4-fluorophenoxy)zirconium, dimethylsilylenebis(2-tert-butyl-4-methylcyclopentadienyl)bis(4-fluorophenoxy)zirconium, dimethylsilylenebis(2-isopropyl-4-methylcyclopentadienyl)bis(4-fluorophenoxy)zirconium, dimethylsilylene(2,3,5-trimethylcyclopentadienyl)(2,4,5-trimethylcyclopentadienyl)bis(4-fluorophenoxy)zirconium, dimethylsilylene(2,4-dimethylcyclopentadienyl)(3,5-dimethylcyclopentadienyl)bis(4-fluorophenoxy)zirconium, dimethylsilylene(3-tert-butylcyclopentadienyl)(4-tert-butylcyclopentadienyl)bis(4-fluorophenoxy)zirconium, dimethylsilylene(3-methylcyclopentadienyl)(4-methylcyclopentadienyl)bis(4-fluorophenoxy)zirconium, dimethylsilylene(2,4-dimethylcyclopentadienyl)(3-methylcyclopentadienyl)bis(4-fluorophenoxy)zirconium, dimethylsilylene(2,4-dimethylcyclopentadienyl)(4-methylcyclopentadienyl)bis(4-fluorophenoxy)zirconium, dimethylsilylene(3,4-dimethylcyclopentadienyl)(3-methylcyclopentadienyl)bis(4-fluorophenoxy)zirconium, dimethylsilylene(3-tert-butylcyclopentadienyl)(3-methylcyclopentadienyl)bis(4-fluorophenoxy)zirconium, dimethylsilylene(3-tert-butylcyclopentadienyl)(4-methylcyclopentadienyl)bis(4-fluorophenoxy)zirconium, dimethylsilylene(2,3,5-trimethylcyclopentadienyl)(cyclopentadienyl)bis(4-fluorophenoxy)zirconium, dimethylsilylene(2,4-dimethylcyclopentadienyl)(cyclopentadienyl)bis(4-fluorophenoxy)zirconium, dimethylsilylene(3-tert-butylcyclopentadienyl)(cyclopentadienyl)bis(4-fluorophenoxy)zirconium, dimethylsilylene(3-methylcyclopentadienyl) (cyclopentadienyl)bis(4-fluorophenoxy)zirconium, dimethylsilylene(cyclopentadienyl)(indenyl)bis(4-trifluoromethylphenoxy)zirconium, dimethylsilylene (cyclopentadienyl)(indenyl)bis(4-fluorophenoxy)zirconium, diphenylsilylenebis(indenyl)bis(4-trifluoromethylphenoxy) zirconium, diphenylsilylenebis(indenyl)bis(4-fluorophenoxy)zirconium, dibenzylsilylenebis(indenyl)bis (4-trifluoromethylphenoxy)zirconium, dibenzylsilylenebis (indenyl)bis(4-fluorophenoxy)zirconium, methylphenylsilylenebis(2-methylindenyl)bis(4-trifluoromethylphenoxy)zirconium, methylphenylsilylenebis(2-methylindenyl)bis(2-fluorophenoxy)zirconium, dimethylsilylenebis(3,4-dimethylcyclopentadienyl)bis(4-trifluoromethylphenoxy) zirconium, dimethylsilylenebis(3,4-dimethylcyclopentadienyl)bis(4-fluorophenoxy)zirconium, dimethylsilylenebis(4,5,6,7-tetrahydroindenyl)bis(4-trifluoromethylphenoxy)zirconium, dimethylsilylenebis(4,5, 6,7-tetrahydroindenyl)bis(4-fluorophenoxy)zirconium, etc.

Further, as the compound of the formula (2) of the present invention, metallocene compounds of the formula wherein the group Y is a chlorine atom, a bromine atom, a hydrogen atom, a methyl group, an ethyl group, a benzyl group, a phenyl group or the like, may be used in addition to the above exemplified ones. They may, for example, be ethylenebis(indenyl)dimethyl zirconium, ethylenebis (indenyl)diethyl zirconium, ethylenebis(indenyl)diphenyl zirconium, ethylenebis(indenyl)methyl zirconium monochloride, ethylenebis(indenyl)ethyl zirconium monochloride, ethylenebis(indenyl)methyl zirconium monobromide, ethylenebis(indenyl)zirconium dichloride, ethylenebis(indenyl)zirconium dibromide, dimethylsilylenebis(cyclopentadienyl)zirconium dichloride, dimethylsilylenebis(indenyl)zirconium dichloride, dimethylsilylenebis(methylcyclopentadienyl)zirconium dichloride, dimethylsilylenebis(dimethylcyclopentadienyl) zirconium dichloride, dimethylsilylenebis (trimethylcyclopentadienyl)zirconium dichloride, isopropylidenebis(indenyl)zirconium dichloride, isopropylidenebis(cyclopentadienylfluolenyl)zirconium dichloride, etc.

Further, as the compound of the formula (2) of the present invention, in addition to the above exemplified various metallocene compounds, metallocene compounds of the formula (2) wherein M is changed from the zirconium atom to a titanium atom or a hafnium atom, may likewise be used.

The solid catalyst for olefin polymerization in the present invention can be prepared by contacting the organoaluminum-oxy compound (B) and the Group IVB transition metal compound (C) containing a ligand having a cyclopentadienyl skeleton, to the above-mentioned silica carrier (A) having the specific physical properties, in an inert hydrocarbon solvent. The method for contacting these three components, is not particularly limited, and it may be a method of contacting the three components simultaneously, or a method wherein two components among the three components are preliminarily contacted, and then the remaining one component is contacted.

Among such methods, a method of contacting the organoaluminum-oxy compound (B) to the carrier (A) and then contacting the metallocene compound (C) thereto, or a method of preliminarily contacting the organoaluminum-oxy compound (B) and the Group IVB transition metal compound (C) containing a ligand having a cyclopentadienyl skeleton and then contacting the obtained product with fine particulate carrier (A), is preferred.

It is preferred to contact the above carrier (A), the organoaluminum-oxy compound (B) and the transition metal compound (C) in an inert solvent of an aromatic hydrocarbon type such as benzene, toluene, xylene or chlorobenzene, or of an aliphatic hydrocarbon type such as hexane, heptane, cyclohexane or methylcyclohexane. Further, after contacting the three components, the formed solid catalyst may be used as it is, or it may be used after washing it with the above-mentioned inert solvent.

At the time of contacting the above carrier (A), the organoaluminum-oxy compound (B) and the transition metal compound (C), the amount of the organoaluminum-oxy compound (B) to 1 g of the carrier (A), is from 1 to 100 mmol, preferably from 5 to 50 mmol, as calculated by Al atom. Further, the transition metal compound (C) is used usually in an amount of from 0.01 to 5 mmol, preferably from 0.05 to 1 mmol, per 1 g of the carrier (A).

Prior to the polymerization of an olefin, the catalyst for olefin polymerization of the present invention may be subjected to treatment by so-called pre-polymerization in which a relatively small amount of an olefin is pre-polymerized. The pre-polymerization is preferably carried out in the presence of an organoaluminum compound (D) as the case requires. The organoaluminum compound (D) to be used, is not particularly limited, and a trialkylaluminum or an organoaluminum-oxy compound may, for example, be used. Specifically, the trialkylaluminum may, for example, be trimethylaluminum, triethylaluminum, triisobutylaluminum, trihexylaluminum or trioctylaluminum. Further, specifically, the organoaluminum-oxy compound may, for example, be methyl aluminoxane, ethyl aluminoxane or isobutyl aluminoxane. Such a compound may have a degree of polymerization of from 2 to 40 and may have a linear or cyclic structure. Further, as the organoaluminum compound (D), a mixture of such exemplified compounds, may be used. The pre-polymerization is carried out to such an extent that the resulting olefin polymer will be in an amount of from 0.05 to 500 g, preferably from 0.1 to 100 g, per 1 g of the supported catalyst.

Further, the catalyst for olefin polymerization of the present invention may be used alone for the polymerization of an olefin. However, it is preferably used together with an organoaluminum compound (E) as a co-catalyst. The organoaluminum compound (E) to be used for the polymerization, is not particularly limited, and the same compound as the organoaluminum compound (D) may be employed.

In a case where the catalyst for olefin polymerization is to be used together with the co-catalyst, they may be added to an inert hydrocarbon solvent or in an olefin medium to be subjected to polymerization. The solid catalyst for olefin polymerization and the co-catalyst may be preliminarily mixed and contacted for a certain time prior to the polymerization, or the respective components may be separately added to the polymerization reaction system. At that time, the order of addition of the respective components can optionally selected.

The solid catalyst for olefin polymerization of the present invention is suitable for use in homopolymerization of ethylene or propylene or copolymerization of ethylene or propylene with at most 10 mol % of a α-olefin, linear diolefin, cyclic olefin, cyclic polyene or an aromatic vinyl compound, having 3 to 20 carbon atoms.

The α-olefin may, for example, be propylene, 1-butene, 3-methyl-1-butene, 1-pentene, 1-hexene, 4-methyl-1-pentene, 3-methyl-1-pentene, 1-octene, 1-decene, 1-dodecene, 1-tetradecene, 1-hexadecene, 1-octadecene, 1-tetradecene, 1-hexadecene, 1-octadecene or 1-icosene.

The linear diolefin is particularly a $C_{4-20}$ linear diolefin. It may, for example, be a non-conjugated diene such as 1,4-pentadiene, 1,4-hexadiene, 1,5-hexadiene, 4-methyl-1,4-hexadiene, 5-methyl-1,4-hexadiene, 5-methyl-1,5-heptadiene, 1,7-octadiene, 7-methyl-1,6-octadiene or 1,9-decadiene, or a conjugated diene such as butadiene, isoprene, chloroprene, 1,3-pentadiene or 1,3-hexadiene.

The cyclic olefin is particularly a $C_{4-40}$ cyclic olefin. It may, for example, be cyclobutene, cyclopentene, cyclohexene, cycloheptene, cyclooctene, 2-norbornene, 5-methyl-2-norbornene, 5-ethyl-2-norbornene, 5-chloro-2-norbornene, 5-methoxy-2-norbornene, 5,6-dicarboxylnorbornene anhydrate, tetracyclododecene or 5-phenylnorbornene.

Further, the cyclic polyene is particularly a $C_{5-40}$ cyclic polyene. It may, for example, be dicyclopentadiene, cyclopentadiene, norbornadiene, 5-vinyl-2-norbornene, 5-ethylidene-2-norbornene or cyclooctatriene. Further, as the aromatic vinyl compound, styrene, α-methylstyrene or divinylbenzene may, for example, be used.

The polymerization of an olefin in the present invention can preferably be carried out by a polymerization method such as slurry polymerization or gas phase polymerization, and it is a feature of the present invention that the powder properties of the obtainable polyolefin are excellent.

When the polymerization of an olefin is carried out in the present invention, an inert hydrocarbon solvent or the olefin to be subjected to the polymerization itself may be used as the solvent. The inert hydrocarbon solvent may, for example, be an aliphatic hydrocarbon such as butane, isobutane, pentane, hexane or octane; an alicyclic hydrocarbon such as cyclopentane, methyl cyclopentane or cyclohexane; an aromatic hydrocarbon such as benzene, toluene or xylene; or a petroleum fraction such as naphtha, kerosine or light oil.

The polymerization temperature in carrying out the polymerization of the present invention is usually within a range of from 20 to 100° C., preferably from 20 to 90° C. in the case of slurry polymerization, and it is usually within a range of from 0 to 120° C., preferably from 20 to 100° C., in the case of the gas phase polymerization. The polymerization pressure is usually from atmospheric pressure to 10 MPa, preferably from atmospheric pressure to 5 MPa. The polymerization reaction may be carried out in any one of a batch system, a semicontinuous system and a continuous system. Further, the polymerization may be carried out in two or more stages having different reaction conditions. The molecular weight of the olefin polymer obtained, can be controlled by permitting hydrogen to exist in the polymerization reaction system or by changing the polymerization temperature.

Now, the present invention will be described in further detail with reference to Examples. However, it should be understood that the present invention is by no means restricted to such specific Examples. In the following Examples, the physical properties were measured by the following methods. Further, the preparation of catalysts and the results of polymerization in Examples and Comparative Examples will be shown as summarized in Tables 1 to 4 given hereinafter.

1. Specific surface area of carrier: calculated by BET method employing BELSORP28SA, manufactured by Nippon Bell Co.

2. Pore volume of carrier: calculated by DH method employing BELSORP28SA, manufactured by Nippon Bell Co.

3. Average particle size of carrier: calculated by a laser diffraction method using LA-910, manufactured by Horiba K.K.

4. Trimethyl aluminum (TMAL) content in methyl aluminoxane: calculated from the $^1$H-NMR spectrum measured at room temperature in a solvent mixture of deuterated dioxane/deuterated benzene using AM-400, manufactured by BRUKER Company.

5. Amounts of aluminum atom, zirconium atom and hafnium atom supported in the solid catalyst: calculated by the ICP analysis using SPS-1500VR, manufactured by Seiko Electronic Industries.

6. Quantitative analysis of the comonomer content in the polymer: obtained from the $^{13}$C-NMR spectrum measured at 125° C. in a solvent mixture of orthodichlorobenzene/deuterated benzene, using AM-400, manufactured by BRUKER Company.

7. Molecular weight and molecular weight distribution of the polymer: measured at 135° C. using gel permeation chromatography (150C, manufactured by Waters Company) and using 1,2,4-trichlorobenzene as a solvent, and Mw and Mn were calculated. Further, Mw/Mn is taken as the molecular weight distribution.

8. Bulk density of the polymer: in accordance with JIS K6721-1966 (in a case where the amount of the polymer was small, the measurement was made in a scale of 1/2).

9. Particle size distribution of the polymer: obtained by classifying 2 g of the polymer by means of eight types of sieves from 32 to 250 mesh by a sound wave type particle size distribution measuring apparatus RPS-85 (manufactured by Seishin Kigyo K.K.). Here, the 50% particle size was taken as the average particle size.

EXAMPLE 1

Preparation of Solid Catalyst

Into a 300 ml glass flask dried and flushed with nitrogen, 5 g of silica ("CARiACT, G-3", manufactured by Fuji Silysia Chemical Ltd., specific surface area: 779 m$^2$/g, pore volume: 0.23 ml/g, average particle size: 6.7 μm) dried at 200° C. for 4 hours and 100 ml of toluene were charged in a nitrogen stream, and an organoaluminum-oxy compound (methyl aluminoxane manufactured by Albemarle Company, TMAL content: 14.5 mol % as calculated by Al atom, concentration as calculated by Al atom: 2.9 mol/liter, 17.2 ml, 50 mmol) was added over a period of 30 minutes at room temperature with stirring, and reacted at 80° C. for one hour. After cooling to room temperature, the obtained solid component was thoroughly washed with toluene and re-suspended in 100 ml of toluene.

Then, 25 ml of a toluene solution containing 0.3 g (0.5 mmol) of bis(1,3-dimethylcyclopentadienyl)bis(2-trifluoromethylphenoxy)zirconium, was added at room temperature and reacted at 80° C. for one hour. After cooling to room temperature, the obtained solid component was thoroughly washed with toluene and then thoroughly washed with hexane to obtain a hexane suspension of a solid catalyst having 10.3 mmol of aluminum atom and 0.11 mmol of zirconium atom supported per 1 g of silica.

Polymerization

Into a 1.6 L stainless steel autoclave having the interior dried and flushed with ethylene, 800 ml of n-hexane was charged and heated to 50° C. Then, 0.5 mmol of triethylaluminum and 24.5 mg of the solid catalyst obtained as described above, were sequentially added. After heating to 75° C., polymerization was carried out for 1 hour under a polymerization pressure of 0.8 MPa, while continuously introducing ethylene. After completion of the polymerization, the polymer was separated from the solvent and dried to obtain 85.3 g of white powdery polyethylene having a bulk density of 330 kg/m$^3$ and an average particle size of 145 μm and containing 1.0 wt % of fine particles having a particle size of at most 63 μm and 0.1 wt % of large particles having a particle size of at least 500 μm. At that time, in the interior of the autoclave, there was no fouling due to e.g. deposition of polyethylene.

Namely, the polyethylene obtained in this Example had a high bulk density, a narrow particle size distribution and excellent powder properties. Further, the polymerization activity of the catalyst in this Example was 3.48 kg-PE/g-cat. The weight average molecular weight (Mw) of the obtained polyethylene was 435,000. The ratio of the weight average molecular weight to the number average molecular weight (Mw/Mn) was 2.3, and the molecular weight distribution was narrow.

EXAMPLE 2
Polymerization

Using the solid catalyst obtained in Example 1, copolymerization of ethylene with 1-hexene was carried out. The polymerization was carried out in the same manner as in Example 1 except that at the time of the polymerization operation, following the charge of n-hexane, 10 ml of 1-hexene was charged, and 23.8 mg of the solid catalyst obtained in Example 1 was used, to obtain 85.4 g of powdery polyethylene having a bulk density of 332 kg/m$^3$ and an average particle size of 147 μm and containing 0.5 wt % of fine particles having a particle size of at most 63 μm and 0.2 wt % of large particles having a particle size of at least 500 μm. The polymerization activity of the catalyst in this Example was 3.59 kg-PE/g-cat. The weight average molecular weight (Mw) of the obtained polyethylene was 370,000. The ratio of the weight average molecular weight to the number average molecular weight (Mw/Mn) was 2.4, and the content of 1-hexene in the copolymer was 0.6 mol %. At that time, in the interior of the autoclave, there was no fouling due to e.g. deposition of polyethylene.

EXAMPLE 3
Preparation of Solid Catalyst

Preparation of a catalyst was carried out in the same manner as in Example 1 except that at the time of the preparation of the solid catalyst of Example 1, instead of methyl aluminoxane manufactured by Albemarle Company, methyl aluminoxane PMAO-L (TMAL content: 23 mol % as calculated by Al atom), manufactured by Tosoh Finechem Company, was used in an amount of 50 mmol as calculated by Al atom, to obtain a solid catalyst having 10.2 mmol of aluminum atom and 0.10 mmol of zirconium atom supported per 1 g of silica.
Polymerization Polymerization was carried out in the same manner as in Example 1 except that 21.1 mg of the solid catalyst obtained as described above, was used, to obtain 59.3 g of powdery polyethylene having a bulk density of 315 kg/m$^3$ and an average particle size of 140 μm and containing 1.1 wt % of fine particles having a particle size of at most 63 μm and 0.1 wt % of large particles having a particle size of at least 500 μm. The polymerization activity of the catalyst in this Example was 2.81 kg-PE/g-cat. The weight average molecular weight (Mw) of the obtained polyethylene was 425,000. The ratio of the weight average molecular weight to the number average molecular weight (Mw/Mn) was 2.3, and the molecular weight distribution was narrow. At that time, in the interior of the autoclave, there was no fouling due to e.g. deposition of polyethylene.

EXAMPLE 4
Preparation of Solid Catalyst

Preparation of a catalyst was carried out in the same manner as in Example 1 except that instead of methyl aluminoxane manufactured by Albemarle Company, methyl aluminoxane PMAO-S (TMAL content: 31 mol % as calculated by Al atom), manufactured by Tosoh Finechem Company, was used in an amount of 50 mmol as calculated by Al atom, to obtain a solid catalyst having 9.8 mmol of aluminum atom and 0.10 mmol of zirconium atom supported per 1 g of silica.
Polymerization Polymerization was carried out in the same manner as in Example 1 except that 19.9 mg of the solid catalyst obtained as described above, was used, to obtain 49.2 g of powdery polyethylene having a bulk density of 327 kg/m$^3$ and an average particle size of 143 μm and containing 0.9 wt % of fine particles having a particle size of at most 63 μm and containing no large particles having a particle size of at least 500 μm. The polymerization activity of the catalyst in this Example was 2.47 kg-PE/g-cat. The weight average molecular weight (Mw) of the obtained polyethylene was 424,000. The ratio of the weight average molecular weight to the number average molecular weight (Mw/Mn) was 2.3, and the molecular weight distribution was narrow. At that time, in the interior of the autoclave, there was no fouling due to e.g. deposition of polyethylene.

EXAMPLE 5
Preparation of Solid Catalyst

Preparation of a catalyst was carried out in the same manner as in Example 1 except that one having methyl aluminoxane PMAO-L (TMAL content: 23 mol % as calculated by Al atom), manufactured by Tosoh Finechem Company, dried under reduced pressure and redissolved in toluene (TMAL content: 10.2 mol % as calculated by Al atom), was used in an amount of 50 mmol as calculated by Al atom, to obtain a solid catalyst having 10.4 mmol of aluminum atom and 0.11 mmol of zirconium atom supported per 1 g of silica.
Polymerization Polymerization was carried out in the same manner as in Example 1 except that 22.2 mg of the solid catalyst obtained as described above, was used, to obtain 75.5 g of powdery polyethylene having a bulk density of 319 kg/m$^3$ and an average particle size of 156 μm and containing 1.2 wt % of fine particles having a particle size of at most 63 μm and 0.1 wt % of large particles having a particle size of at least 500 μm. The polymerization activity of the catalyst in this Example was 3.40 kg-PE/g-cat. The weight average molecular weight (Mw) of the obtained polyethylene was 431,000. The ratio of the weight average molecular weight to the number average molecular weight (Mw/Mn) was 2.4, and the molecular weight distribution was narrow. At that time, in the interior of the autoclave, there was no fouling due to e.g. deposition of polyethylene.

EXAMPLE 6
Preparation of Solid Catalyst

Preparation of a catalyst was carried out in the same manner as in Example 3 except that silica ("CARiACT, G-3", manufactured by Fuji Silysia Chemical Ltd., specific surface area: 779 m$^2$/g, pore volume: 0.23 ml/g, average particle size: 11.5 μm) was used, to obtain a solid catalyst having 10.2 mmol of aluminum atom and 0.10 mmol of zirconium atom supported per 1 g of silica.
Polymerization Polymerization was carried out in the same manner as in Example 1 except that 20.9 mg of the solid catalyst obtained as described above, was used, to obtain 50.2 g of powdery polyethylene having a bulk density of 334 kg/m$^3$ and an average particle size of 169 μm and containing 0.2 wt % of fine particles having a particle size of at most 63 μm and 0.2 wt % of large particles having a particle size of at least 500 μm. The polymerization activity of the catalyst in this Example was 2.40 kg-PE/g-cat. The weight average molecular weight (Mw) of the obtained polyethylene was 429,000. The ratio of the weight average molecular weight to the number average molecular weight (Mw/Mn) was 2.3, and the molecular weight distribution was narrow. At that time, in the interior of the autoclave, there was no fouling due to e.g. deposition of polyethylene.

EXAMPLE 7
Preparation of Solid Catalyst

Preparation of a catalyst was carried out in the same manner as in Example 3 except that silica ("Sunsphere H-121", manufactured by Asahi Glass Company, Limited, specific surface area: 809 $m^2$/g, pore volume: 0.73 ml/g, average particle size: 11.7 μm) was used, to obtain a solid catalyst having 10.1 mmol of aluminum atom and 0.10 mmol of zirconium atom supported per 1 g of silica.
Polymerization Polymerization was carried out in the same manner as in Example 1 except that 24.6 mg of the solid catalyst obtained as described above, was used, to obtain 56.8 g of powdery polyethylene having a bulk density of 328 kg/$m^3$ and an average particle size of 162 μm and containing 0.7 wt % of fine particles having a particle size of at most 63 μm and 0.2 wt % of large particles having a particle size of at least 500 μm. The polymerization activity of the catalyst in this Example was 2.31 kg-PE/g-cat. The weight average molecular weight (Mw) of the obtained polyethylene was 430,000. The ratio of the weight average molecular weight to the number average molecular weight (Mw/Mn) was 2.3, and the molecular weight distribution was narrow. At that time, in the interior of the autoclave, there was no fouling due to e.g. deposition of polyethylene.

EXAMPLE 8
Preparation of Solid Catalyst

Preparation of a catalyst was carried out in the same manner as in Example 3 except that silica ("Sunsphere H-121 C", manufactured by Asahi Glass Company, Limited, specific surface area: 789 $m^2$/g, pore volume: 0.69 ml/g, average particle size: 11.6 μm) was used, to obtain a solid catalyst having 10.2 mmol of aluminum atom and 0.11 mmol of zirconium atom supported per 1 g of silica.
Polymerization Polymerization was carried out in the same manner as in Example 1 except that 24.7 mg of the solid catalyst obtained as described above, was used, to obtain 65.9 g of powdery polyethylene having a bulk density of 310 kg/$m^3$ and an average particle size of 158 μm and containing 0.9 wt % of fine particles having a particle size of at most 63 μm and 0.1 wt % of large particles having a particle size of at least 500 μm. The polymerization activity of the catalyst in this Example was 2.67 kg-PE/g-cat. The weight average molecular weight (Mw) of the obtained polyethylene was 432,000. The ratio of the weight average molecular weight to the number average molecular weight (Mw/Mn) was 2.2, and the molecular weight distribution was narrow. At that time, in the interior of the autoclave, there was no fouling due to e.g. deposition of polyethylene.

EXAMPLE 9
Preparation of Solid Catalyst

Preparation of a catalyst was carried out in the same manner as in Example 3 except that silica ("Sunsphere H-121 C1", manufactured by Asahi Glass Company, Limited, specific surface area: 648 $m^2$/g, pore volume: 0.51 ml/g, average particle size: 10.5 μm) was used, to obtain a solid catalyst having 9.9 mmol of aluminum atom and 0.10 mmol of zirconium atom supported per 1 g of silica.
Polymerization Polymerization was carried out in the same manner as in Example 1 except that 20.5 mg of the solid catalyst obtained as described above, was used, to obtain 49.8 g of powdery polyethylene having a bulk density of 305 kg/$m^3$ and an average particle size of 147 μm and containing 1.2 wt % of fine particles having a particle size of at most 63 μm and 0.1 wt % of large particles having a particle size of at least 500 μm. The polymerization activity of the catalyst in this Example was 2.43 kg-PE/g-cat. The weight average molecular weight (Mw) of the obtained polyethylene was 424,000. The ratio of the weight average molecular weight to the number average molecular weight (Mw/Mn) was 2.2, and the molecular weight distribution was narrow. At that time, in the interior of the autoclave, there was no fouling due to e.g. deposition of polyethylene.

EXAMPLE 10
Preparation of Solid Catalyst

Preparation of a catalyst was carried out in the same manner as in Example 1 except that silica ("Sunsphere H-121 C1", manufactured by Asahi Glass Company, Limited, specific surface area: 648 $m^2$/g, pore volume: 0.51 ml/g, average particle size: 10.5 μm) was used, to obtain a solid catalyst having 10.0 mmol of aluminum atom and 0.10 mmol of zirconium atom supported per 1 g of silica.
Polymerization Polymerization was carried out in the same manner as in Example 1 except that 19.3 mg of the solid catalyst obtained as described above, was used, to obtain 57.1 g of powdery polyethylene having a bulk density of 299 kg/$m^3$ and an average particle size of 160 μm and containing 0.2 wt % of fine particles having a particle size of at most 63 μm and 0.3 wt % of large particles having a particle size of at least 500 μm. The polymerization activity of the catalyst in this Example was 2.96 kg-PE/g-cat. The weight average molecular weight (Mw) of the obtained polyethylene was 427,000. The ratio of the weight average molecular weight to the number average molecular weight (Mw/Mn) was 2.3, and the molecular weight distribution was narrow. At that time, in the interior of the autoclave, there was no fouling due to e.g. deposition of polyethylene.

EXAMPLE 11
Preparation of Solid Catalyst

Preparation of a catalyst was carried out in the same manner as in Example 3 except that silica ("Sunsphere H-51 C1", manufactured by Asahi Glass Company, Limited, specific surface area: 620 $m^2$/g, pore volume: 0.61 ml/g, average particle size: 4.5 μm) was used, to obtain a solid catalyst having 10.3 mmol of aluminum atom and 0.11 mmol of zirconium atom supported per 1 g of silica.
Polymerization Polymerization was carried out in the same manner as in Example 1 except that 19.0 mg of the solid catalyst obtained as described above, was used, to obtain 49.2 g of powdery polyethylene having a bulk density of 314 kg/$m^3$ and an average particle size of 124 μm and containing 1.3 wt % of fine particles having a particle size of at most 63 μm and containing no large particles having a particle size of at least 500 μm. The polymerization activity of the catalyst in this Example was 2.59 kg-PE/g-cat. The weight average molecular weight (Mw) of the obtained polyethylene was 436,000. The ratio of the weight average molecular weight to the number average molecular weight (Mw/Mn) was 2.3, and the molecular weight distribution was narrow. At that time, in the interior of the autoclave, there was no fouling due to e.g. deposition of polyethylene.

COMPARATIVE EXAMPLE 1

Preparation of Solid Catalyst

Preparation of a catalyst was carried out in the same manner as in Example 3 except that silica ("CARiACT, P-10", manufactured by Fuji Silysia Chemical Ltd., specific surface area: 304 m$^2$/g, pore volume: 1.44 ml/g, average particle size: 28.3 μm) was used, to obtain a solid catalyst having 10.5 mmol of aluminum atom and 0.10 mmol of zirconium atom supported per 1 g of silica.

Polymerization

Polymerization was carried out in the same manner as in Example 1 except that 47.2 mg of the solid catalyst obtained as described above, was used, to obtain 20.3 g of powdery polyethylene having a bulk density of 321 kg/m$^3$ and an average particle size of 395 μm and containing 0.9 wt % of fine particles having a particle size of at most 63 μm and 23.5 wt % of large particles having a particle size of at least 500 μm. The polymerization activity of the catalyst in this Example was extremely low at a level of 0.43 kg-PE/g-cat. The weight average molecular weight (Mw) of the obtained polyethylene was 379,000. The ratio of the weight average molecular weight to the number average molecular weight (Mw/Mn) was 2.4. At that time, in the interior of the autoclave, a fouling due to e.g. deposition of polyethylene, was observed.

COMPARATIVE EXAMPLE 2

Preparation of Solid Catalyst

Preparation of a catalyst was carried out in the same manner as in Example 3 except that silica ("CARiACT, Q-6", manufactured by Fuji Silysia Chemical Ltd., specific surface area: 462 m$^2$/g, pore volume: 0.92 ml/g, average particle size: 12.5 μm) was used, to obtain a solid catalyst having 10.1 mmol of aluminum atom and 0.10 mmol of zirconium atom supported per 1 g of silica.

Polymerization

Polymerization was carried out in the same manner as in Example 1 except that 21.5 mg of the solid catalyst obtained as described above, was used, to obtain 6.2 g of powdery polyethylene. The polymerization activity of the catalyst in this Example was extremely low at a level of 0.29 kg-PE/g-cat, and the bulk density and the particle size distribution could not be measured. The weight average molecular weight (Mw) of the obtained polyethylene was 398,000. The ratio of the weight average molecular weight to the number average molecular weight (Mw/Mn) was 2.3. At that time, in the interior of the autoclave, slight fouling due to e.g. deposition of polyethylene, was observed.

COMPARATIVE EXAMPLE 3

Preparation of Solid Catalyst

Preparation of a catalyst was carried out in the same manner as in Example 5 except that silica ("CARiACT, Q-6", manufactured by Fuji Silysia Chemical Ltd., specific surface area: 462 m$^2$/g, pore volume: 0.92 ml/g, average particle size: 12.5 μm) was used, to obtain a solid catalyst having 10.7 mmol of aluminum atom and 0.11 mmol of zirconium atom supported per 1 g of silica.

Polymerization

Polymerization was carried out in the same manner as in Example 1 except that 23.8 mg of the solid catalyst obtained as described above, was used, to obtain 29.3 g of powdery polyethylene having a bulk density of 215 kg/m$^3$ and an average particle size of 198 μm and containing 8.8 wt % of fine particles having a particle size of at most 63 μm and 0.5 wt % of large particles having a particle size of at least 500 μm. The polymerization activity of the catalyst in this Example was low at a level of 1.23 kg-PE/g-cat. The weight average molecular weight (Mw) of the obtained polyethylene was 417,000. The ratio of the weight average molecular weight to the number average molecular weight (Mw/Mn) was 2.3. At that time, in the interior of the autoclave, slight fouling due to e.g. deposition of polyethylene, was observed.

COMPARATIVE EXAMPLE 4

Preparation of Solid Catalyst

Preparation of a catalyst was carried out in the same manner as in Example 3 except that silica ("Sunsphere H122", manufactured by Asahi Glass Company, Limited, specific surface area: 689 m$^2$/g, pore volume: 1.61 ml/g, average particle size: 10.7 μm) was used, to obtain a solid catalyst having 10.1 mmol of aluminum atom and 0.10 mmol of zirconium atom supported per 1 g of silica.

Polymerization

Polymerization was carried out in the same manner as in Example 1 except that 25.1 mg of the solid catalyst obtained as described above, was used, to obtain 6.8 g of powdery polyethylene. The polymerization activity of the catalyst in this Example was extremely low at a level of 0.27 kg-PE/g-cat, and the bulk density and the particle size distribution could not be measured. The weight average molecular weight (Mw) of the obtained polyethylene was 378,000. The ratio of the weight average molecular weight to the number average molecular weight (Mw/Mn) was 2.3.

COMPARATIVE EXAMPLE 5

Preparation of Solid Catalyst

Preparation of a catalyst was carried out in the same manner as in Example 3 except that silica ("Sunsphere H52", manufactured by Asahi Glass Company, Limited, specific surface area: 625 m$^2$/g, pore volume: 1.42 ml/g, average particle size: 5.1 μm) was used, to obtain a solid catalyst having 10.2 mmol of aluminum atom and 0.10 mmol of zirconium atom supported per 1 g of silica.

Polymerization

Polymerization was carried out in the same manner as in Example 1 except that 23.3 mg of the solid catalyst obtained as described above, was used, to obtain 16.5 g of powdery polyethylene having a bulk density of 210 kg/m$^3$ and an average particle size of 150 μm and containing 8.9 wt % of fine particles having a particle size of at most 63 μm and 10.3 wt % of large particles having a particle size of at least 500 μm. The polymerization activity of the catalyst in this Example was low at a level of 0.71 kg-PE/g-cat. The weight average molecular weight (Mw) of the obtained polyethylene was 389,000. The ratio of the weight average molecular weight to the number average molecular weight (Mw/Mn) was 2.3. At that time, in the interior of the autoclave, fouling due to e.g. deposition of polyethylene, was observed.

COMPARATIVE EXAMPLE 6

Preparation of Solid Catalyst

Preparation of a catalyst was carried out in the same manner as in Example 3 except that silica ("Sunsphere H51", manufactured by Asahi Glass Company, Limited, specific surface area: 528 m$^2$/g, pore volume: 0.82 ml/g, average particle size: 4.9 μm) was used, to obtain a solid catalyst having 10.4 mmol of aluminum atom and 0.11 mmol of zirconium atom supported per 1 g of silica.

Polymerization

Polymerization was carried out in the same manner as in Example 1 except that 20.0 mg of the solid catalyst obtained as described above, was used, to obtain 22.2 g of powdery polyethylene having a bulk density of 190 kg/m³ and an average particle size of 139 μm and containing 9.3 wt % of fine particles having a particle size of at most 63 μm and 2.8 wt % of large particles having a particle size of at least 500 μm. The polymerization activity of the catalyst in this Example was low at a level of 1.11 kg-PE/g-cat. The weight average molecular weight (Mw) of the obtained polyethylene was 397,000. The ratio of the weight average molecular weight to the number average molecular weight (Mw/Mn) was 2.3. At that time, in the interior of the autoclave, slight fouling due to e.g. deposition of polyethylene, was observed.

COMPARATIVE EXAMPLE 7

Preparation of Solid Catalyst

Preparation of a catalyst was carried out in the same manner as in Example 3 except that silica (one having "Sunsphere H121", manufactured by Asahi Glass Company, Limited, specific surface area: 809 m²/g, pore volume: 0.73 ml/g, average particle size: 11.7 μm, calcined at 750° C. for one hour; specific surface area: 500 m²/g, pore volume: 0.47 ml/g, average particle size: 10.2 μm) was used, to obtain a solid catalyst having 9.3 mmol of aluminum atom and 0.10 mmol of zirconium atom supported per 1 g of silica.

Polymerization

Polymerization was carried out in the same manner as in Example 1 except that 21.2 mg of the solid catalyst obtained as described above, was used, to obtain 28.4 g of powdery polyethylene having a bulk density of 230 kg/m³ and an average particle size of 170 μm and containing 1.5 wt % of fine particles having a particle size of at most 63 μm and 2.1 wt % of large particles having a particle size of at least 500 μm. The polymerization activity of the catalyst in this Example was low at a level of 1.34 kg-PE/g-cat. The weight average molecular weight (Mw) of the obtained polyethylene was 392,000. The ratio of the weight average molecular weight to the number average molecular weight (Mw/Mn) was 2.3. At that time, in the interior of the autoclave, slight fouling due to e.g. deposition of polyethylene, was observed.

COMPARATIVE EXAMPLE 8

Preparation of Solid Catalyst

Preparation of a catalyst was carried out in the same manner as in Example 3 except that silica ("Sunsphere L121", manufactured by Asahi Glass Company, Limited, specific surface area: 332 m²/g, pore volume: 0.95 ml/g, average particle size: 11.5 μm) was used. The obtained solid catalyst had only 8.9 mmol of aluminum atom and 0.09 mmol of zirconium atom supported per 1 g of the silica, and only a part of the aluminoxane and the transition metal compound used, was supported.

Polymerization

Polymerization was carried out in the same manner as in Example 1 except that 24.6 mg of the solid catalyst obtained as described above, was used, to obtain 11.1 g of powdery polyethylene. The polymerization activity of the catalyst in this Example was extremely low at a level of 0.45 kg-PE/g-cat, and the bulk density and the particle size distribution could not be measured.

COMPARATIVE EXAMPLE 9

Preparation of Solid Catalyst

Preparation of a catalyst was carried out in the same manner as in Example 3 except that silica ("Sunsphere L121C", manufactured by Asahi Glass Company, Limited, specific surface area: 123 m²/g, pore volume: 0.32 ml/g, average particle size: 10.6 μm) was used. The obtained solid catalyst had only 2.2 mmol of aluminum atom and 0.08 mmol of zirconium atom supported per 1 g of the silica, and only a part of the aluminoxane and the transition metal compound used, was supported.

Polymerization

Polymerization was carried out in the same manner as in Example 1 except that 26.2 mg of the solid catalyst obtained as described above, was used, to obtain 2.6 g of powdery polyethylene. The polymerization activity of the catalyst in this Example was extremely low at a level of 0.10 kg-PE/g-cat, and the bulk density and the particle size distribution could not be measured.

COMPARATIVE EXAMPLE 10

Preparation of Solid Catalyst

Preparation of a catalyst was carried out in the same manner as in Example 3 except that silica ("Sunsphere NP100", manufactured by Asahi Glass Company, Limited, specific surface area: 108 m²/g, pore volume: 0.12 ml/g, average particle size: 9.1 μm) was used. The obtained solid catalyst had only 3.4 mmol of aluminum atom and 0.09 mmol of zirconium atom supported per 1 g of the silica, and only a part of the aluminoxane and the transition metal compound used, was supported.

Polymerization

Polymerization was carried out in the same manner as in Example 1 except that 23.9 mg of the solid catalyst obtained as described above, was used, to obtain 9.1 g of powdery polyethylene. The polymerization activity of the catalyst in this Example was extremely low at a level of 0.38 kg-PE/g-cat, and the bulk density and the particle size distribution could not be measured.

EXAMPLE 12

Preparation of Solid Catalyst

Preparation of a catalyst was carried out in the same manner as in Example 1 except that 0.5 mmol of bis(1,3-dimethylcyclopentadienyl)zirconium dichloride was used instead of bis(1,3-dimethylcyclopentadienyl)bis(2-trifluoromethylphenoxy)zirconium, to obtain a solid catalyst having 10.1 mmol of aluminum atom and 0.10 mmol of zirconium atom supported per 1 g of silica.

Polymerization

Polymerization was carried out in the same manner as in Example 1 except that 15.5 mg of the solid catalyst obtained as described above, was used, to obtain 43.3 g of powdery polyethylene having a bulk density of 310 kg/m³ and an average particle size of 150 μm and containing 0.6 wt % of fine particles having a particle size of at most 63 μm and 0.1 wt % of large particles having a particle size of at least 500 μm. The polymerization activity of the catalyst in this Example was 2.79 kg-PE/g-cat. The weight average molecular weight (Mw) of the obtained polyethylene was 432,000. The ratio of the weight average molecular weight to the number average molecular weight (Mw/Mn) was 2.2, and the molecular weight distribution was narrow. At that time, in the interior of the autoclave, there was no fouling due to e.g. deposition of polyethylene.

EXAMPLE 13

Polymerization

Polymerization was carried out in the same manner as in Example 2 except that 16.2 mg of the solid catalyst obtained in Example 12, was used, to obtain 48.9 g of powdery polyethylene having a bulk density of 325 kg/m³ and an average particle size of 155 μm and containing 0.3 wt % of fine particles having a particle size of at most 63 µm and 0.1 wt % of large particles having a particle size of at least 500 µm. The polymerization activity of the catalyst in this Example was 3.02 kg-PE/g-cat. The weight average molecular weight (Mw) of the obtained polyethylene was 371,000. The ratio of the weight average molecular weight to the number average molecular weight (Mw/Mn) was 2.3, and the content of 1-hexene in the copolymer was 0.6 mol %. At that time, in the interior of the autoclave, there was no fouling due to e.g. deposition of polyethylene.

EXAMPLE 14
Preparation of Solid Catalyst

Preparation of a catalyst was carried out in the same manner as in Example 3 except that 0.5 mmol of bis(n-butylcyclopentadienyl)zirconium dichloride was used instead of bis(1,3-dimethylcyclopentadienyl)bis(2-trifluoromethylphenoxy)zirconium, to obtain a solid catalyst having 9.8 mmol of aluminum atom and 0.10 mmol of zirconium atom supported per 1 g of silica.

Polymerization

Polymerization was carried out in the same manner as in Example 2 except that 12.3 mg of the solid catalyst obtained as described above, was used, to obtain 120.7 g of powdery polyethylene having a bulk density of 329 kg/m$^3$ and an average particle size of 187 µm and containing 0.4 wt % of fine particles having a particle size of at most 63 µm and 0.6 wt % of large particles having a particle size of at least 500 µm. The polymerization activity of the catalyst in this Example was 9.81 kg-PE/g-cat. The weight average molecular weight (Mw) of the obtained polyethylene was 227,000. The ratio of the weight average molecular weight to the number average molecular weight (Mw/Mn) was 2.2, and the molecular weight distribution was narrow. At that time, in the interior of the autoclave, there was no fouling due to e.g. deposition of polyethylene.

EXAMPLE 15
Polymerization

Polymerization was carried out in the same manner as in Example 2 except that 12.9 mg of the solid catalyst obtained in Example 14, was used, to obtain 102.6 g of powdery polyethylene having a bulk density of 322 kg/m$^3$ and an average particle size of 179 µm and containing 0.3 wt % of fine particles having a particle size of at most 63 µm and 0.4 wt % of large particles having a particle size of at least 500 µm. The polymerization activity of the catalyst in this Example was 7.95 kg-PE/g-cat. The weight average molecular weight (Mw) of the obtained polyethylene was 114,000. The ratio of the weight average molecular weight to the number average molecular weight (Mw/Mn) was 2.2, and the content of 1-hexene in the copolymer was 0.7 mol %. At that time, in the interior of the autoclave, there was no fouling due to e.g. deposition of polyethylene.

EXAMPLE 16
Preparation of Solid Catalyst

Preparation of a catalyst was carried out in the same manner as in Example 1 except that 0.5 mmol of ethylenebis(4,5,6,7-tetrahydro-1-indenyl)zirconium dichloride was used instead of bis(1,3-dimethylcyclopentadienyl)bis(2-trifluoromethylphenoxy)zirconium, to obtain a solid catalyst having 10.0 mmol of aluminum atom and 0.10 mmol of zirconium atom supported per 1 g of silica.

Polymerization

Polymerization was carried out in the same manner as in Example 1 except that 17.9 mg of the solid catalyst obtained as described above, was used, to obtain 73.5 g of powdery polyethylene having a bulk density of 341 kg/m$^3$ and an average particle size of 154 µm and containing 0.8 wt % of fine particles having a particle size of at most 63 µm and 0.2 wt % of large particles having a particle size of at least 500 µm. The polymerization activity of the catalyst in this Example was 4.11 kg-PE/g-cat. The weight average molecular weight (Mw) of the obtained polyethylene was 246,000. The ratio of the weight average molecular weight to the number average molecular weight (Mw/Mn) was 2.4, and the molecular weight distribution was narrow. At that time, in the interior of the autoclave, there was no fouling due to e.g. deposition of polyethylene.

EXAMPLE 17
Preparation of Solid Catalyst

Preparation of a catalyst was carried out in the same manner as in Example 8 except that 0.5 mmol of bis(1,2,4-trimethylcyclopentadienyl)zirconium dichloride was used instead of bis(1,3-dimethylcyclopentadienyl)bis(2-trifluoromethylphenoxy)zirconium, to obtain a solid catalyst having 9.9 mmol of aluminum atom and 0.11 mmol of zirconium atom supported per 1 g of silica.

Polymerization

Polymerization was carried out in the same manner as in Example 1 except that 17.0 mg of the solid catalyst obtained as described above, was used, to obtain 40.7 g of powdery polyethylene having a bulk density of 338 kg/m$^3$ and an average particle size of 184 µm and containing 0.4 wt % of fine particles having a particle size of at most 63 µm and 0.7 wt % of large particles having a particle size of at least 500 µm. The polymerization activity of the catalyst in this Example was 2.39 kg-PE/g-cat. The weight average molecular weight (Mw) of the obtained polyethylene was 329,000. The ratio of the weight average molecular weight to the number average molecular weight (Mw/Mn) was 2.5, and the molecular weight distribution was narrow. At that time, in the interior of the autoclave, there was no fouling due to e.g. deposition of polyethylene.

EXAMPLE 18
Polymerization

Polymerization was carried out in the same manner as in Example 2 except that 17.3 mg of the solid catalyst obtained in Example 17, was used, to obtain 36.7 g of powdery polyethylene having a bulk density of 316 kg/m$^3$ and an average particle size of 181 µm and containing 0.1 wt % of fine particles having a particle size of at most 63 µm and 0.4 wt % of large particles having a particle size of at least 500 µm. The polymerization activity of the catalyst in this Example was 2.12 kg-PE/g-cat. The weight average molecular weight (Mw) of the obtained polyethylene was 224,000. The ratio of the weight average molecular weight to the number average molecular weight (Mw/Mn) was 2.4, and the content of 1-hexene in the copolymer was 0.5 mol %. At that time, in the interior of the autoclave, there was no fouling due to e.g. deposition of polyethylene.

EXAMPLE 19
Preparation of Solid Catalyst

Preparation of a catalyst was carried out in the same manner as in Example 9 except that 0.5 mmol of bis(n-butylcyclopentadienyl)zirconium dichloride was used instead of bis(1,3-dimethylcyclopentadienyl)bis(2-trifluoromethylphenoxy)zirconium, to obtain a solid catalyst having 9.8 mmol of aluminum atom and 0.10 mmol of zirconium atom supported per 1 g of silica.

Polymerization

Polymerization was carried out in the same manner as in Example 1 except that 15.3 mg of the solid catalyst obtained as described above, was used, to obtain 132.9 g of powdery polyethylene having a bulk density of 331 kg/m³ and an average particle size of 213 μm and containing 0.3 wt % of fine particles having a particle size of at most 63 μm and 0.5 wt % of large particles having a particle size of at least 500 μm. The polymerization activity of the catalyst in this Example was 8.69 kg-PE/g-cat. The weight average molecular weight (Mw) of the obtained polyethylene was 209,000. The ratio of the weight average molecular weight to the number average molecular weight (Mw/Mn) was 2.2, and the molecular weight distribution was narrow. At that time, in the interior of the autoclave, there was no fouling due to e.g. deposition of polyethylene.

EXAMPLE 20
Preparation of Solid Catalyst

Preparation of a catalyst was carried out in the same manner as in Example 10 except that 0.5 mmol of bis(n-butylcyclopentadienyl)hafnium dichloride was used instead of bis(1,3-dimethylcyclopentadienyl)bis(2-trifluoromethylphenoxy)zirconium, to obtain a solid catalyst having 10.1 mmol of aluminum atom and 0.11 mmol of hafnium atom supported per 1 g of silica.
Polymerization Polymerization was carried out in the same manner as in Example 1 except that 22.8 mg of the solid catalyst obtained as described above, was used, to obtain 29.6 g of powdery polyethylene having a bulk density of 280 kg/m³ and an average particle size of 172 μm and containing 0.7 wt % of fine particles having a particle size of at most 63 μm and 0.2 wt % of large particles having a particle size of at least 500 μm. The polymerization activity of the catalyst in this Example was 1.30 kg-PE/g-cat. At that time, in the interior of the autoclave, there was no fouling due to e.g. deposition of polyethylene.

COMPARATIVE EXAMPLE 11
Preparation of Solid Catalyst

Preparation of a catalyst was carried out in the same manner as in Comparative Example 1 except that 0.5 mmol of bis(n-butylcyclopentadienyl)zirconium dichloride was used instead of bis(1,3-dimethylcyclopentadienyl)bis(2-trifluoromethylphenoxy)zirconium, to obtain a solid catalyst having 9.7 mmol of aluminum atom and 0.11 mmol of zirconium atom supported per 1 g of the silica.
Polymerization Polymerization was carried out in the same manner as in Example 1 except that 22.4 mg of the solid catalyst obtained as described above, was used, to obtain 51.5 g of powdery polyethylene having a bulk density of 187 kg/m³ and an average particle size of 401 μm and containing 0.1 wt % of fine particles having a particle size of at most 63 μm and 35.6 wt % of large particles having a particle size of at least 500 μm. The polymerization activity of the catalyst in this Example was 2.30 kg-PE/g-cat. The weight average molecular weight (Mw) of the obtained polyethylene was 187,000. The ratio of the weight average molecular weight to the number average molecular weight (Mw/Mn) was 2.3, and the molecular weight distribution was narrow. At that time, in the interior of the autoclave, a fouling due to e.g. deposition of polyethylene was observed.

COMPARATIVE EXAMPLE 12
Preparation of Solid Catalyst

Preparation of a catalyst was carried out in the same manner as in Comparative Example 2 except that 0.5 mmol of bis(n-butylcyclopentadienyl)zirconium dichloride was used instead of bis(1,3-dimethylcyclopentadienyl)bis(2-trifluoromethylphenoxy)zirconium, to obtain a solid catalyst having 8.9 mmol of aluminum atom and 0.10 mmol of zirconium atom supported per 1 g of the silica.
Polymerization Polymerization was carried out in the same manner as in Example 1 except that 23.1 mg of the solid catalyst obtained as described above, was used, to obtain 25.4 g of powdery polyethylene having a bulk density of 221 kg/m³ and an average particle size of 287 μm and containing 0.7 wt % of fine particles having a particle size of at most 63 μm and 13.9 wt % of large particles having a particle size of at least 500 μm. The polymerization activity of the catalyst in this Example was 1.09 kg-PE/g-cat. The weight average molecular weight (Mw) of the obtained polyethylene was 199,000. The ratio of the weight average molecular weight to the number average molecular weight (Mw/Mn) was 2.4, and the molecular weight distribution was narrow. At that time, in the interior of the autoclave, slight fouling due to e.g. deposition of polyethylene was observed.

TABLE 1

| | Component (A) | | | | | Supported amount* | |
|---|---|---|---|---|---|---|---|
| | Specific surface area (m²/g) | Pore volume (ml/g) | Average particle size (μm) | Component (B) TMAL content (mol %) | Component (C) | Zr (mmol) | Al (mmol) |
| Ex. 1 | 779 | 0.23 | 6.7 | 14.5 | (1,3-Me₂Cp)₂Zr(o-CF₃—OPh)₂** | 0.11 | 10.3 |
| Ex. 2 | ↑ | ↑ | ↑ | ↑ | ↑ | ↑ | ↑ |
| Ex. 3 | ↑ | ↑ | ↑ | 23 | ↑ | 0.10 | 10.2 |
| Ex. 4 | ↑ | ↑ | ↑ | 31 | ↑ | 0.10 | 9.8 |
| Ex. 5 | ↑ | ↑ | ↑ | 10.2 | ↑ | 0.11 | 10.4 |
| Ex. 6 | 779 | 0.23 | 11.5 | 23 | ↑ | 0.10 | 10.2 |
| Ex. 7 | 809 | 0.73 | 11.7 | 23 | ↑ | 0.10 | 10.1 |
| Ex. 8 | 789 | 0.69 | 11.6 | 23 | ↑ | 0.11 | 10.2 |
| Ex. 9 | 648 | 0.51 | 10.5 | 23 | ↑ | 0.10 | 9.9 |
| Ex. 10 | ↑ | ↑ | ↑ | 14.5 | ↑ | 0.10 | 10.0 |
| Ex. 11 | 620 | 0.61 | 4.5 | 23 | ↑ | 0.11 | 10.3 |
| Comp. Ex. 1 | 304 | 1.44 | 28.3 | 23 | ↑ | 0.10 | 10.5 |
| Comp. Ex. 2 | 462 | 0.92 | 12.5 | 23 | ↑ | 0.10 | 10.1 |

TABLE 1-continued

|  | Component (A) Specific surface area (m²/g) | Pore volume (ml/g) | Average particle size (μm) | Component (B) TMAL content (mol %) | Component (C) | Supported amount* Zr (mmol) | Al (mmol) |
|---|---|---|---|---|---|---|---|
| Comp. Ex. 3 | ↑ | ↑ | ↑ | 10.2 | ↑ | 0.11 | 10.7 |
| Comp. Ex. 4 | 689 | 1.61 | 10.7 | 23 | ↑ | 0.10 | 10.1 |
| Comp. Ex. 5 | 625 | 1.42 | 5.1 | 23 | ↑ | 0.10 | 10.2 |
| Comp. Ex. 6 | 528 | 0.82 | 4.9 | 23 | ↑ | 0.11 | 10.4 |
| Comp. Ex. 7 | 500 | 0.47 | 10.2 | 23 | ↑ | 0.10 | 9.3 |
| Comp. Ex. 8 | 332 | 0.95 | 11.5 | 23 | ↑ | 0.09 | 8.9 |
| Comp. Ex. 9 | 123 | 0.32 | 10.6 | 23 | ↑ | 0.08 | 2.2 |
| Comp. Ex. 10 | 108 | 0.12 | 9.1 | 23 | ↑ | 0.09 | 3.4 |

*Amount supported per 1 g of the silica
**Bis(1,3-dimethylcyclopentadienyl)bis(2-trifluoromethylphenoxy)zirconium

TABLE 2

|  | Polymer yield (g) | Activity (kg/g-cat) | Bulk density (kg/m³) | Average particle size (μm) | Fine powder (<63 μm) (wt %) | Large particles (>500 μm) (wt %) | Molecular weight (Mw: ×10³) | Deposition* |
|---|---|---|---|---|---|---|---|---|
| Ex. 1 | 85.3 | 3.48 | 330 | 145 | 1.0 | 0.1 | 435 | − |
| Ex. 2 | 85.4 | 3.59 | 332 | 147 | 0.5 | 0.2 | 370 | − |
| Ex. 3 | 59.3 | 2.81 | 315 | 140 | 1.1 | 0.1 | 425 | − |
| Ex. 4 | 49.2 | 2.47 | 327 | 143 | 0.9 | 0.0 | 424 | − |
| Ex. 5 | 75.5 | 3.40 | 319 | 156 | 1.2 | 0.1 | 431 | − |
| Ex. 6 | 50.2 | 2.40 | 334 | 169 | 0.2 | 0.2 | 429 | − |
| Ex. 7 | 56.8 | 2.31 | 329 | 162 | 0.7 | 0.2 | 430 | − |
| Ex. 8 | 65.9 | 2.67 | 310 | 158 | 0.9 | 0.1 | 432 | − |
| Ex. 9 | 49.8 | 2.43 | 305 | 147 | 1.2 | 0.1 | 424 | − |
| Ex. 10 | 57.1 | 2.96 | 299 | 160 | 0.2 | 0.3 | 427 | − |
| Ex. 11 | 49.2 | 2.59 | 314 | 124 | 1.3 | 0.0 | 436 | − |
| Comp. Ex. 1 | 20.3 | 0.43 | 231 | 395 | 23.5 | 0.9 | 379 | ++ |
| Comp. Ex. 2 | 6.2 | 0.29 | — | — | —.— | —.— | 398 | + |
| Comp. Ex. 3 | 29.3 | 1.23 | 215 | 198 | 8.8 | 0.5 | 417 | + |
| Comp. Ex. 4 | 6.8 | 0.27 | — | — | —.— | —.— | 378 | − |
| Comp. Ex. 5 | 16.5 | 0.71 | 210 | 150 | 8.9 | 10.3 | 389 | ++ |
| Comp. Ex. 6 | 22.2 | 1.11 | 190 | 139 | 9.3 | 2.8 | 397 | + |
| Comp. Ex. 7 | 28.4 | 1.34 | 230 | 170 | 1.5 | 2.1 | 392 | + |
| Comp. Ex. 8 | 11.1 | 0.45 | — | — | —.— | —.— | — | − |
| Comp. Ex. 9 | 2.6 | 0.10 | — | — | —.— | —.— | — | − |
| Comp. Ex. 10 | 9.1 | 0.38 | — | — | —.— | —.— | — | − |

Deposition*
−: No deposition to the interior of the autoclave was observed.
+: Slight deposition to the interior of the autoclave was observed.
++: Substantial deposition to the interior of the autoclave was observed.

TABLE 3

| | Component (A) | | | | | Supported amount* | |
|---|---|---|---|---|---|---|---|
| | Specific surface area ($m^2/g$) | Pore volume (ml/g) | Average particle size ($\mu m$) | Component (B) TMAL content (mol %) | Component (C) | Zr (mmol) | Al (mmol) |
| Ex. 12 | 779 | 0.23 | 6.9 | 14.5 | $(1,3\text{-}Me_2Cp)_2ZrCl_2$[1] | 0.10 | 10.1 |
| Ex. 13 | ↑ | ↑ | ↑ | ↑ | ↑ | ↑ | ↑ |
| Ex. 14 | ↑ | ↑ | ↑ | 23 | $(n\text{-}BuCp)_2ZrCl_2$[2] | 0.10 | 9.8 |
| Ex. 15 | ↑ | ↑ | ↑ | ↑ | ↑ | ↑ | ↑ |
| Ex. 16 | ↑ | ↑ | ↑ | 14.5 | $Et(THInd)_2ZrCl_2$[3] | 0.10 | 10.0 |
| Ex. 17 | 789 | 0.69 | 11.6 | 23 | $(1,2,4\text{-}Me_3Cp)_2ZrCl_2$[4] | 0.11 | 9.9 |
| Ex. 18 | ↑ | ↑ | ↑ | ↑ | ↑ | ↑ | ↑ |
| Ex. 19 | 648 | 0.51 | 10.5 | 23 | $(n\text{-}BuCp)_2ZrCl_2$ | 0.10 | 9.8 |
| Ex. 20 | ↑ | ↑ | ↑ | 14.5 | $(n\text{-}BuCp)_2HfCl_2$[5] | 0.11** | 10.1 |
| Comp. Ex. 11 | 304 | 1.44 | 28.3 | 23 | $(n\text{-}BuCp)_2ZrCl_2$ | 0.11 | 9.7 |
| Comp. Ex. 12 | 462 | 0.92 | 12.5 | 23 | ↑ | 0.10 | 8.9 |

*Amount supported per 1 g of the silica
**Amount of hafnium supported per 1 g of the silica
[1] Bis(1,3-dimethylcyclopentadienyl)zirconium dichloride
[2] Bis(n-butylcyclopentadienyl)zirconium dichloride
[3] Ethylenebis(4,5,6,7-tetrahydro-1-indenyl)zirconium dichloride
[4] Bis(1,2,4-trimethylcyclopentadienyl)zirconium dichloride
[5] Bis(n-butylcyclopentadienyl)hafnium dichloride.

TABLE 4

| | Polymer yield (g) | Activity (kg/g-cat) | Bulk density (kg/$m^3$) | Average particle size ($\mu m$) | Fine powder (<63 $\mu m$) (wt %) | Large particles (>500 $\mu m$) (wt %) | Molecular weight (Mw: ×$10^3$) | Deposition* |
|---|---|---|---|---|---|---|---|---|
| Ex. 12 | 43.3 | 2.79 | 310 | 150 | 0.6 | 0.1 | 432 | − |
| Ex. 13 | 48.9 | 3.02 | 325 | 155 | 0.3 | 0.1 | 371 | − |
| Ex. 14 | 120.7 | 9.81 | 329 | 187 | 0.4 | 0.6 | 227 | − |
| Ex. 15 | 102.6 | 7.95 | 322 | 179 | 0.3 | 0.4 | 114 | − |
| Ex. 16 | 73.5 | 4.11 | 341 | 154 | 0.8 | 0.2 | 246 | − |
| Ex. 17 | 40.7 | 2.39 | 338 | 184 | 0.4 | 0.7 | 329 | − |
| Ex. 18 | 36.7 | 2.12 | 316 | 181 | 0.1 | 0.4 | 224 | − |
| Ex. 19 | 132.9 | 8.69 | 331 | 213 | 0.3 | 0.5 | 209 | − |
| Ex. 20 | 29.6 | 1.30 | 280 | 172 | 0.7 | 0.2 | — | − |
| Comp. Ex. 11 | 51.5 | 2.30 | 187 | 401 | 0.1 | 35.6 | 187 | ++ |
| Comp. Ex. 12 | 25.4 | 1.09 | 221 | 287 | 0.7 | 13.9 | 199 | + |

Deposition*
−: No deposition to the interior of the autoclave was observed.
+: Slight deposition to the interior of the autoclave was observed.
++: Substantial deposition to the interior of the autoclave was observed.

With the solid catalyst for olefin polymerization according to the present invention, even when an aluminoxane containing a free trialkylaluminum, which is usually readily available, is used as it is, a high polymerization activity can be obtained, and it is possible to efficiently produce an olefin polymer having a high bulk density, a narrow particle size distribution, an excellent powder properties such as low content of large particles and fine powder, and further a narrow molecular weight distribution. It is thereby possible to improve the productivity or to reduce the cost for the catalyst relative to the product.

The entire disclosures of Japanese Patent Application No. 2002-204480 filed on Jul. 12, 2002 and Japanese Patent Application No. 2002-248836 filed on Aug. 28, 2002 including specifications, claims and summaries are incorporated herein by reference in their entireties.

What is claimed is:

1. A solid catalyst for olefin polymerization, which comprises a silica carrier (A) having a specific surface area of from 600 to 850 $m^2$/g, a pore volume of from 0.1 to 0.8 ml/g and an average particle size of from 2 to 12 $\mu m$, and an organoaluminum-oxy compound (B) and a Group IVB transition metal compound (C) containing a ligand having a cyclopentadienyl skeleton, supported on the carrier (A).

2. The solid catalyst for olefin polymerization according to claim 1, wherein the transition metal compound (C) is a compound of the formula (1) or (2):

$$(R^1{}_a Cp)_m (R^2{}_b Cp)_n M(Y)_{4-(m+n)} \tag{1}$$

wherein M represents titanium, zirconium or hafnium, Cp represents a group having a cyclopentadienyl skeleton, each of $R^1$ and $R^2$ represents a hydrogen atom, an alkyl group, an alkenyl group, an aryl group, an alkylaryl group, an arylalkyl group or an alkylsilyl group, Y represents a halogen atom, a hydrogen atom, a hydrocarbon group, an alkylsilyl group, or an aryloxy group substituted by a halogen atom, a hydrocarbon group, an alkylsilyl group, a halogenated hydrocarbon group, a nitrogen-containing organic group, an oxygen-containing organic group or a sulfur-containing organic group, each of a and b is an integer of from 0 to 5, and each of m and n is an integer of from 0 to 3, provided that m+n is an integer of from 1 to 3;

  (2)

wherein M represents titanium, zirconium or hafnium, Cp represents a group having a cyclopentadienyl skeleton, each of $R^1$ and $R^2$ represents a hydrogen atom, an alkyl group, an alkenyl group, an aryl group, an alkylaryl group, an arylalkyl group or an alkylsilyl group, R' represents a divalent group which links ($R^1_cCp$) and ($R^2_dCp$), selected from the group consisting of an alkylene group, an arylalkylene group, a dialkylsilylene group, a dialkylgermylene group, an alkylphosphinediyl group and an alkylimino group, Y represents a halogen atom, a hydrogen atom, a hydrocarbon group, an alkylsilyl group, or an aryloxy group substituted by a halogen atom, a hydrocarbon group, an alkylsilyl group, a halogenated hydrocarbon group, a nitrogen-containing organic group, an oxygen-containing organic group or a sulfur-containing organic group, and each of c and d is an integer of from 0 to 4.

3. The solid catalyst for olefin polymerization according to claim 1, wherein a solution of the organoaluminum-oxy compound (B) contains a trialkylaluminum in an amount of at most 35 mol %, as calculated by Al atom.

4. The solid catalyst for olefin polymerization according to claim 1, wherein per 1 g of the carrier (A), from 1 to 100 mmol, as calculated by Al atom, of the organoaluminum-oxy compound (B) and from 0.01 to 5 mmol of the transition metal compound (C) are supported.

5. The solid catalyst for olefin polymerization according to claim 1, wherein the silica carrier (A) has a specific surface area of from 700 to 800 $m^2/g$, a pore volume of from 0.15 to 0.3 ml/g and an average particle size of from 4 to 10 μm.

6. The solid catalyst for olefin polymerization obtained by pre-polymerizing an olefin in the presence of the solid catalyst as defined in any one of claims 1 to 5 and an organoaluminum compound (D).

7. A process for producing an olefinic polymer, which comprises polymerizing or copolymerizing an olefin in the presence of the solid catalyst for olefin polymerization as defined in claim 1 and an organoaluminum compound (E).

8. The process for producing an olefinic polymer according to claim 7, wherein the polymerization or copolymerization of the olefin is carried out by a slurry polymerization or a gas phase polymerization.

9. A process for producing an olefinic polymer, which comprises polymerizing or copolymerizing an olefin in the presence of the solid catalyst for olefin polymerization as defined in claim 6 and an organoaluminum compound (E).

10. The process for producing an olefinic polymer according to claim 9, wherein the polymerization or copolymerization of the olefin is carried out by a slurry polymerization or a gas phase polymerization.

* * * * *